(12) United States Patent
Gerasopoulos et al.

(10) Patent No.: US 11,817,553 B2
(45) Date of Patent: Nov. 14, 2023

(54) DEEP EUTECTIC SOLVENT-BASED GEL POLYMER ELECTROLYTES

(71) Applicant: The Johns Hopkins University, Baltimore, MD (US)

(72) Inventors: Konstantinos Gerasopoulos, Odenton, MD (US); Christopher M. Hoffman, Jr., Odenton, MD (US); Adam W. Freeman, Laurel, MD (US); Matthew W. Logan, Columbia, MD (US); Spencer A. Langevin, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 58 days.

(21) Appl. No.: 16/559,709

(22) Filed: Sep. 4, 2019

(65) Prior Publication Data

US 2020/0343586 A1    Oct. 29, 2020

Related U.S. Application Data

(60) Provisional application No. 62/840,052, filed on Apr. 29, 2019.

(51) Int. Cl.
*H01M 10/0565*    (2010.01)
*H01M 10/0525*    (2010.01)

(52) U.S. Cl.
CPC ... *H01M 10/0565* (2013.01); *H01M 10/0525* (2013.01); *H01M 2300/0085* (2013.01)

(58) Field of Classification Search
CPC ........ H01M 6/22; H01M 6/162; H01M 6/164; H01M 10/10; H01M 10/0565; H01M 2300/0085; H01M 2300/0022; Y02E 60/10
See application file for complete search history.

(56) References Cited

U.S. PATENT DOCUMENTS 6,322,923 B1 * 11/2001 Spotnitz .............. H01M 50/449
429/144

OTHER PUBLICATIONS

Deng, Ming-Jay, et al. "4.2 V wearable asymmetric supercapacitor devices based on a VO x//MnO x paper electrode and an eco-friendly deep eutectic solvent-based gel electrolyte." Journal of Materials Chemistry A 6.42 (2018): 20686-20694. (Year: 2018).*
Qin, Huan, and Matthew J. Panzer. "Chemically Cross-Linked Poly (2-hydroxyethyl methacrylate)-Supported Deep Eutectic Solvent Gel Electrolytes for Eco-Friendly Supercapacitors." ChemElectroChem 4.10 (2017): 2556-2562. (Year: 2017).*
Mukesh, Chandrakant, et al. "Preparation of a natural deep eutectic solvent mediated self polymerized highly flexible transparent gel having super capacitive behaviour." RSC advances 6.34 (2016): 28586-28592. (Year: 2016).*

(Continued)

*Primary Examiner* — Niki Bakhtiari
*Assistant Examiner* — Grace Ann Kenlaw
(74) *Attorney, Agent, or Firm* — Sung T. Kim

(57) ABSTRACT

A gel polymer electrolyte (GPE) composition and a method of forming the same are provided. The GPE includes a polymer network and an electrolyte composition comprising a deep eutectic solvent (DES) having a eutectic point of less than or equal to 25° C. An electrochemical cell including a GPE and a method of forming the same are also provided.

11 Claims, 23 Drawing Sheets

(56) References Cited

OTHER PUBLICATIONS

Wu, Feng, et al. "Binary room-temperature complex electrolytes based on LiClO4 and organic compounds with acylamino group and its characterization for electric double layer capacitors." Journal of power sources 184.2 (2008): 402-407. (Year: 2008).*

Jingwen Zhao, et al.,"Water-in-deep eutectic solvent" electrolytes enable zinc metal anodes for rechargeable aqueous batteries, Nano Energy, vol. 57, 2019, DOI:https://doi.org/10.1016/j.nanoen.2018.12.086 (Year: 2019).*

Zhao, Jingwen, et al. "A smart flexible zinc battery with cooling recovery ability." Angewandte Chemie International Edition 56.27 (2017): 7871-7875. (Year: 2017).*

Hammond, Oliver S., Daniel T. Bowron, and Karen J. Edler. "The effect of water upon deep eutectic solvent nanostructure: an unusual transition from ionic mixture to aqueous solution." Angewandte Chemie International Edition 56.33 (2017): 9782-9785. (Year: 2017).*

Millia, Luca, et al. "Bio-inspired choline chloride-based deep eutectic solvents as electrolytes for lithium-ion batteries." Solid State Ionics 323 (2018): 44-48. (Year: 2018).*

\* cited by examiner

DEEP EUTECTIC SOLVENT-BASED GEL POLYMER ELECTROLYTES

CROSS-REFERENCE TO RELATED APPLICATIONS

This application claims priority under 35 U.S.C. § 119(e) to U.S. Provisional Patent Application Ser. No. 62/840,052, filed on Apr. 29, 2019, which is expressly incorporated by reference herein in its entirety.

TECHNICAL FIELD

Embodiments of the presently-disclosed invention relate generally to gel polymer electrolyte (GPE) compositions including a polymer network and an electrolyte composition comprising a deep eutectic solvent (DES) having a eutectic point of less than or equal to 25° C. Embodiments of the presently-disclosed invention also relate generally to electrochemical cells including a GPE including a DES having a eutectic point of less than or equal to 25° C.

BACKGROUND

It is well known that DESs are eutectic mixtures consisting of an ionic species and a hydrogen bond donor. These unique mixtures have lower melting points than the individual constituents and possess interesting properties. DESs are generally made from environmentally-friendly, inexpensive, and biodegradable components. They have particularly low vapor pressures, are non-flammable, and possess a wide electrochemical stability window. DESs have been used in batteries, but low ionic conductivity has limited their potential.

SUMMARY

Certain embodiments according to the invention provide a GPE composition including a polymer network and an electrolyte composition. In accordance with certain embodiments of the invention, the electrolyte composition comprises a DES having a eutectic point of less than or equal to 25° C.

In another aspect, embodiments of the present invention provide an electrochemical cell including an anode, a cathode, and a GPE positioned between and in contact with the anode and the cathode. In accordance with certain embodiments of the invention, the GPE includes a GPE-composition comprising a polymer network and an electrolyte composition absorbed by the GPE. In accordance with certain embodiments of the invention, the electrolyte composition comprises a DES.

In another aspect, embodiments of the present invention provide a method of forming a GPE. In accordance with certain embodiments of the invention, the method of forming a GPE may comprise combining a DES solution and a monomer-containing composition to form a GPE-precursor composition. The method may further comprise radically-curing the GPE-precursor composition to form the GPE.

In another aspect, embodiments of the present invention provide a method of forming an electrochemical cell including providing an anode and a cathode. The method may further comprise depositing a pre-fabricated GPE between and in contact with the anode and the cathode in which the pre-fabricated GPE comprises a DES, or forming the GPE directly onto the anode or the cathode in which the GPE is disposed between and in contact with the anode and the cathode and the GPE comprises a DES.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements Like numbers refer to like elements throughout, and wherein.

Figure 18:
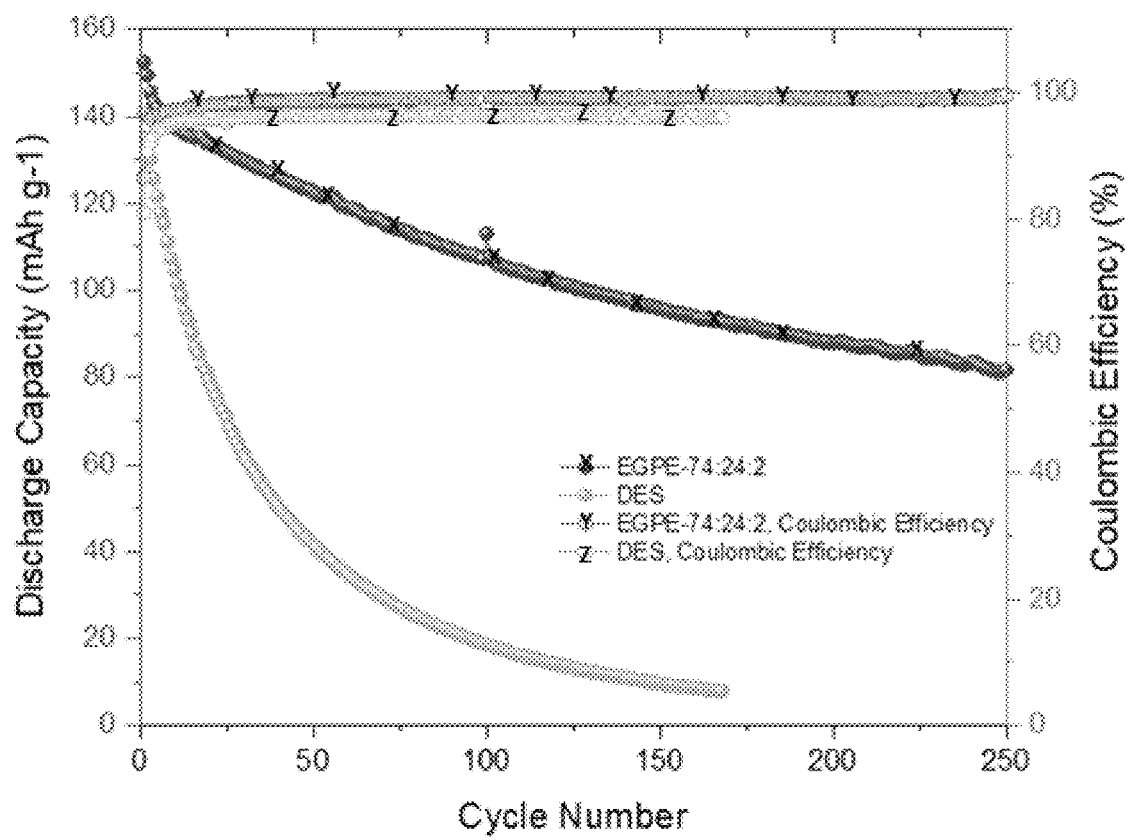
FIG. 18 is a plot showing cell performance of both GPE and liquid DES-based electrochemical cells into which 1.5 wt. % water (based on total electrolyte mass) has been added according to certain embodiments of the invention.
Figure 19:
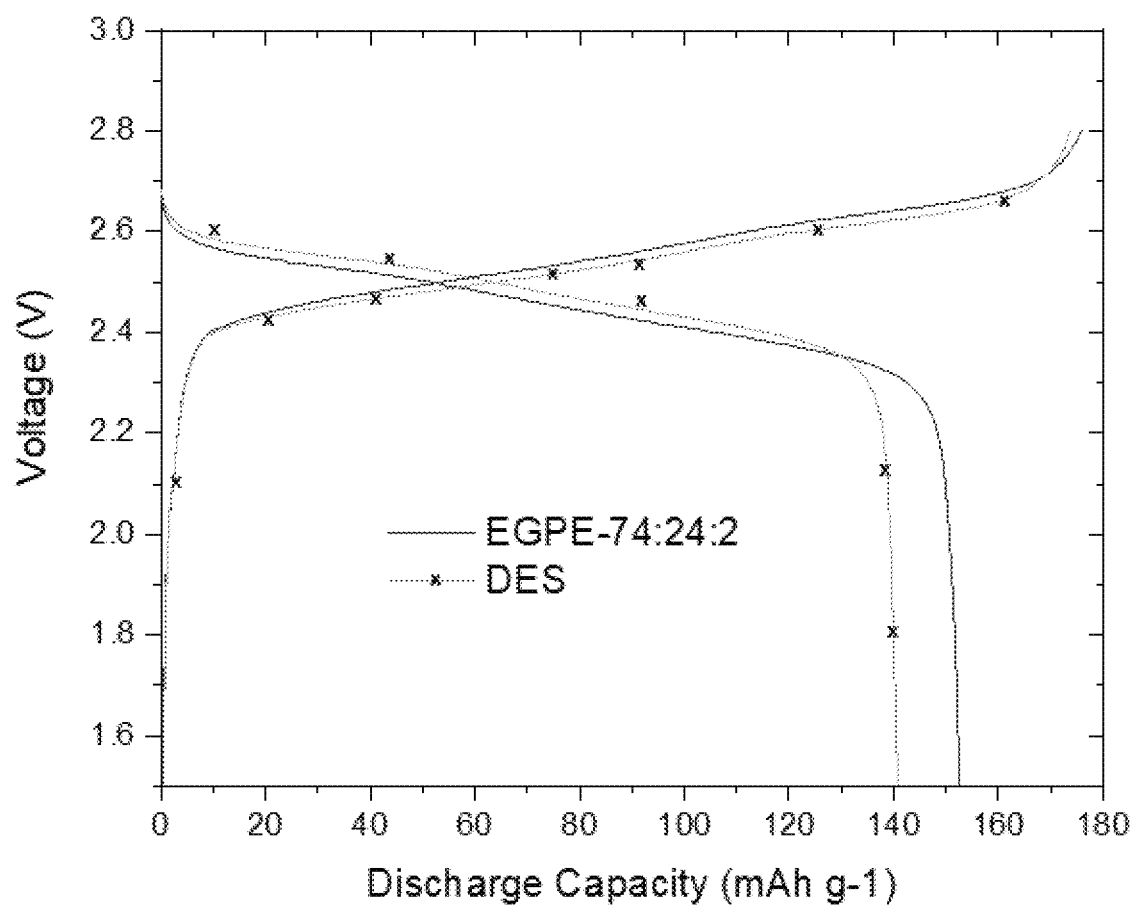
Figure 20:
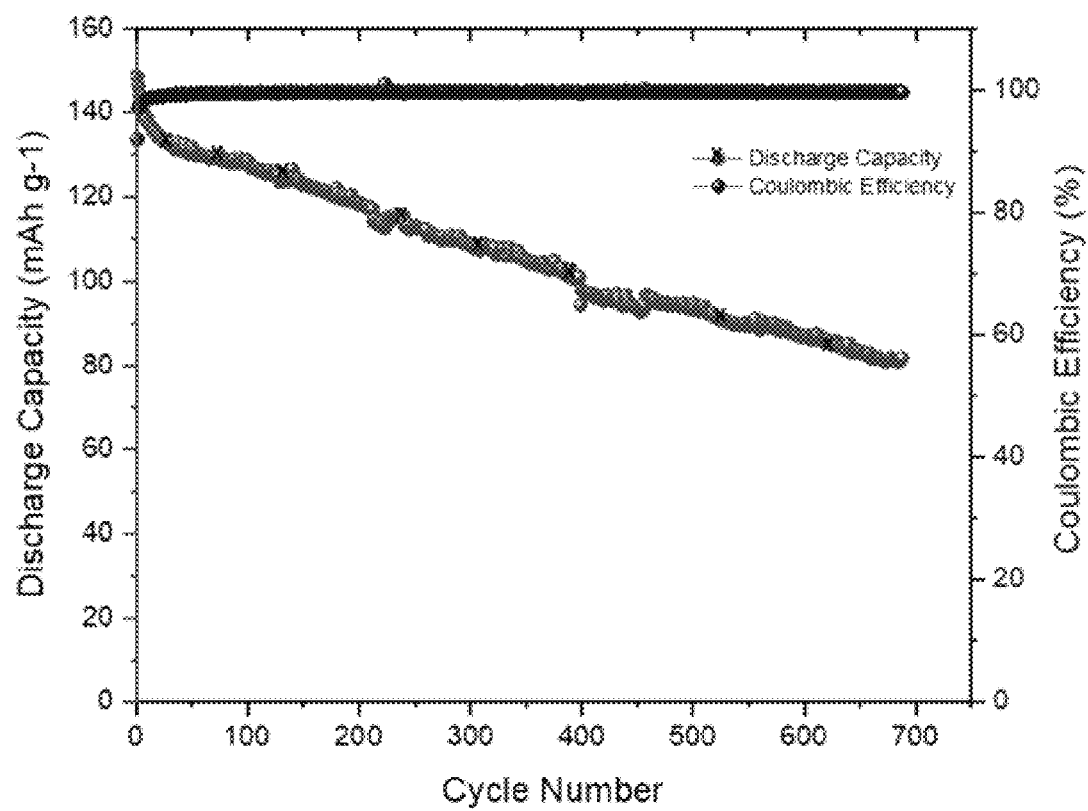
Figure 21:
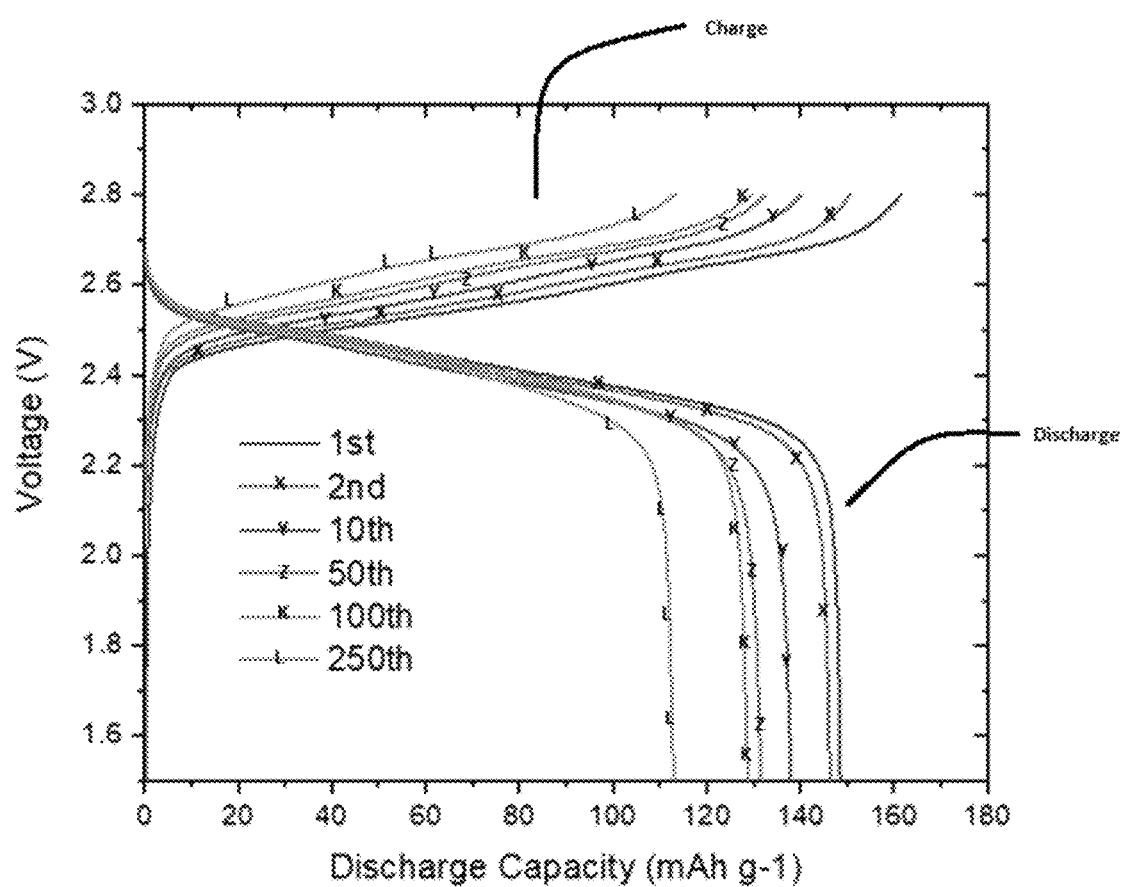
Figure 22:
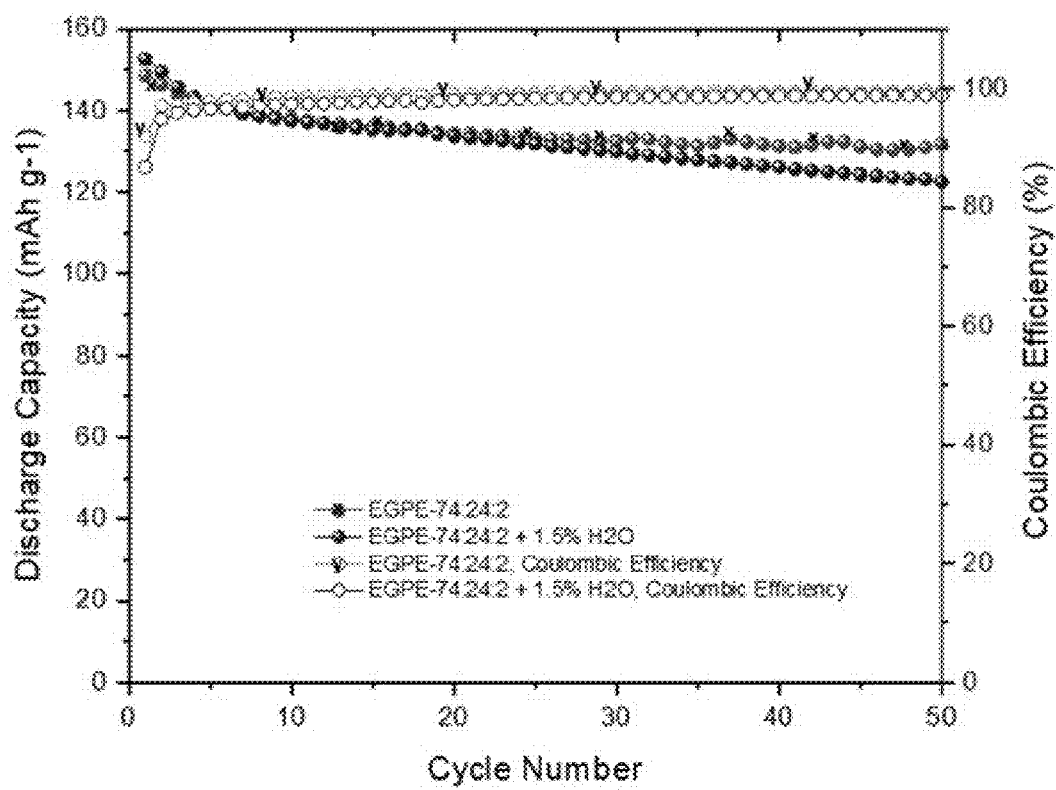
Figure 23:
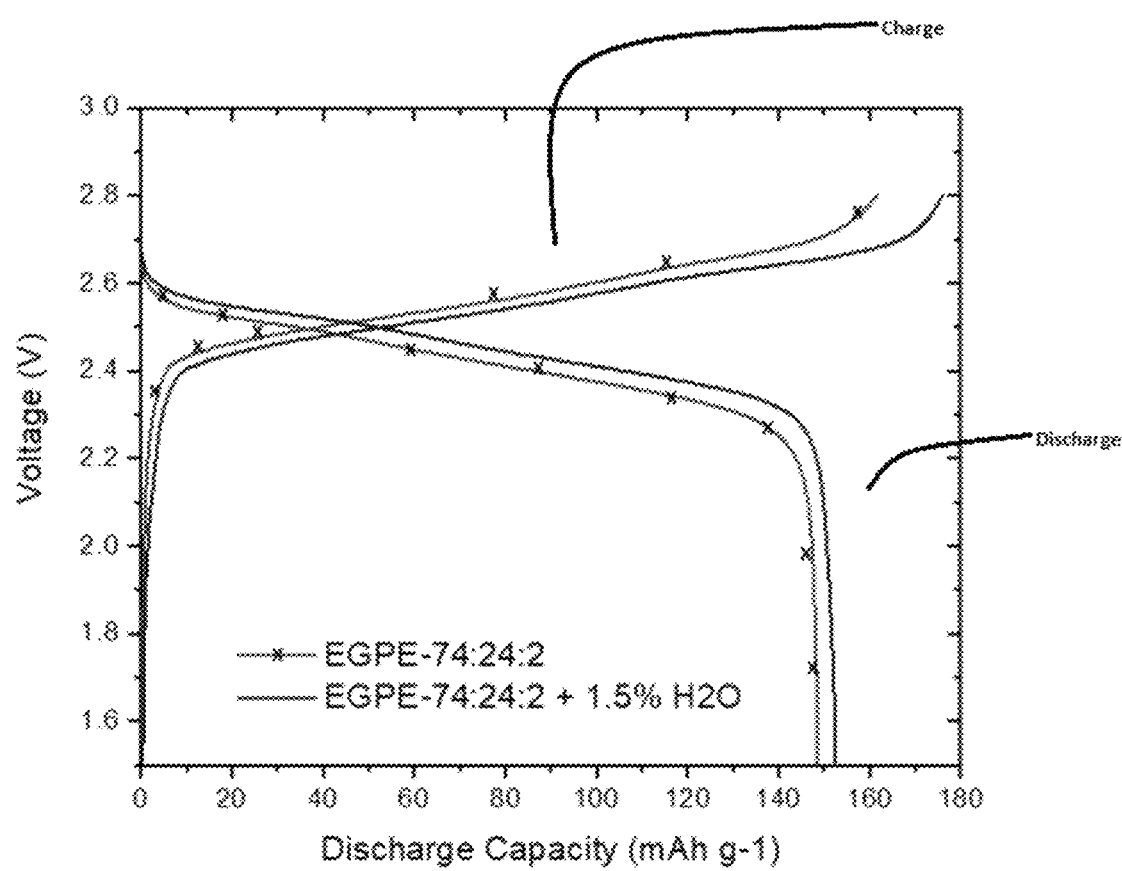
Figure 24:
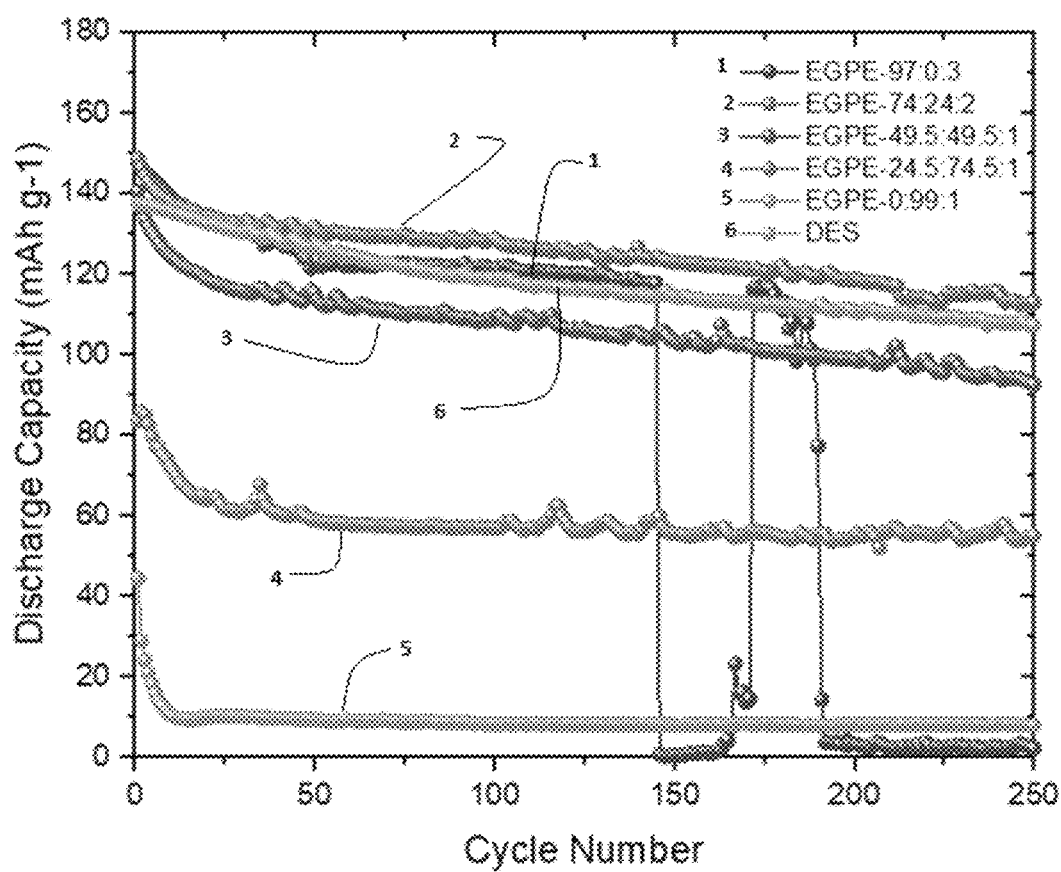
Figure 25:
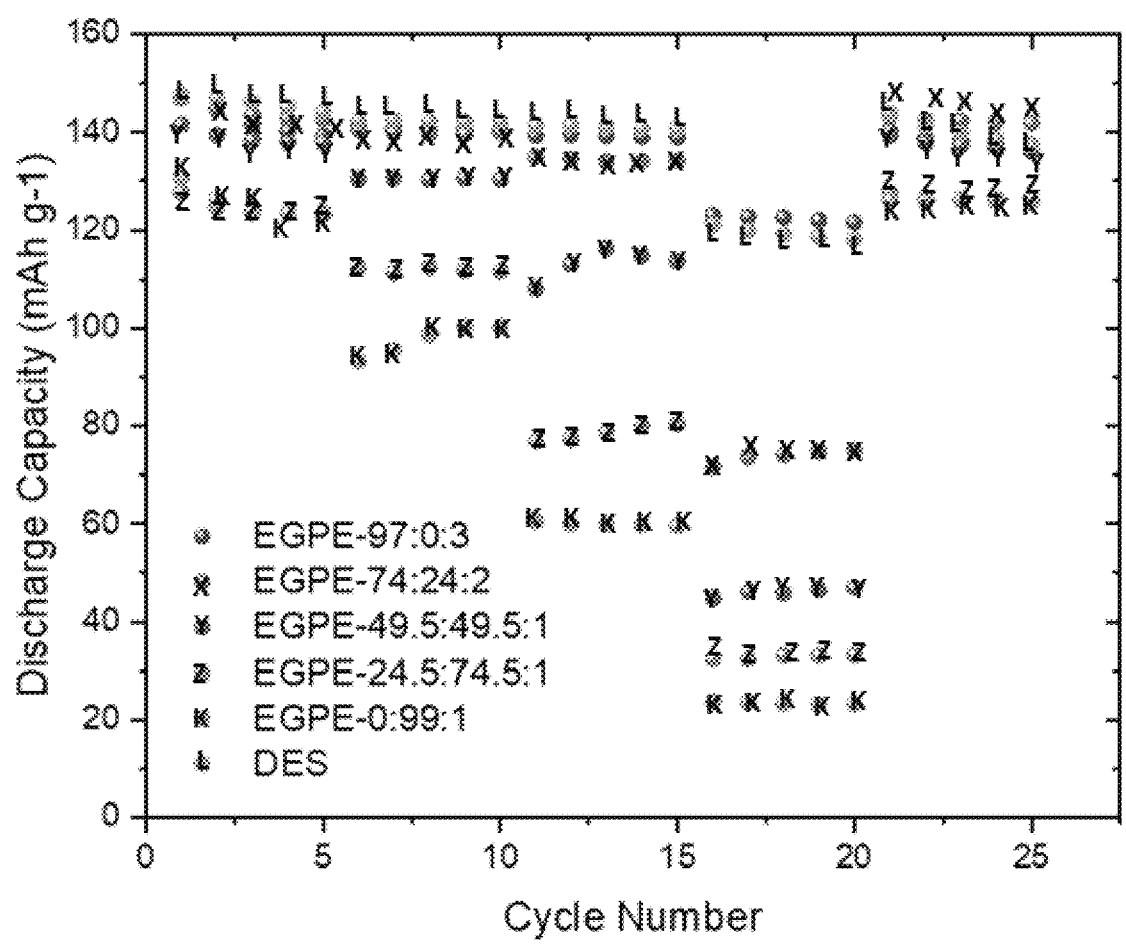

FIG. 19 shows the discharge capacities for the electrochemical cells of FIG. 18 according to certain embodiments of the invention;

FIG. 20 is a plot showing electrochemical cell performance in accordance with certain embodiments of the invention;

FIG. 21 shows the discharge capacity through 250 cycles for the electrochemical cell of FIG. 20 according to certain embodiments of the invention;

FIG. 22 is a plot showing electrochemical cell performance of DES-based GPEs made with and without 1.5 wt % water (based on total electrolyte mass) in accordance with certain embodiments of the invention;

FIG. 23 shows the discharge capacities for the electrochemical cells of FIG. 22 according to certain embodiments of the invention;

FIG. 24 is a plot of the discharge capacities vs. cycle number for electrochemical cells according to certain embodiments of the invention; and FIG. 25 is an additional plot of the discharge capacities vs. cycle number for the electrochemical cells of FIG. 24 according to certain embodiments of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Embodiments of the invention relate generally to GPE compositions and electrochemical cells including the same, in which the GPE compositions include a DES. In accordance with certain embodiments of the invention, the DES solution, which may include a small addition of water thereto or not, may be mixed with a monomer-containing composition. In this regard, the resulting mixture of the DES solution and the monomer-containing composition may then be subjected to a polymerization process to provide a GPE including a polymer network and the DES. In accordance with certain embodiments of the invention, the integration of the DES into the polymer network of the GPE beneficially improves cycle life compared to the use of a DES alone as an electrolyte composition. In accordance with certain embodiments of the invention, the GPE composition may include a small amount of water (e.g., prior to initial use) which may be desirable, for instance, to reduce the viscosity of the GPE composition, improve ionic conductivity, and thus, enhance capacity without compromising coulombic efficiency.

Certain embodiments according to the invention provide a GPE composition including a polymer network and an electrolyte composition. In accordance with certain embodiments of the invention, the electrolyte composition comprises a DES having a eutectic point (e.g., lowest freezing/solidifying temperature for the DES) of less than or equal to 25° C. In accordance with certain embodiments of the invention, the DES may have a eutectic point of less than about 25° C., such as a eutectic point of equal to or less than about any of the following: 25° C., 20° C., 15° C., 10° C., 5° C., 0° C., −5° C., −10° C., −15° C., −20° C., and −25° C. In accordance with certain embodiments of the invention, the DES includes a eutectic point that is below the operating temperature of an electrochemical cell such that the DES remains in a liquid state over the entire operating window of the electrochemical cell. In accordance with certain embodiments of the invention, the presence of polymer network may further suppress the eutectic point of the DES.

Figure 1:
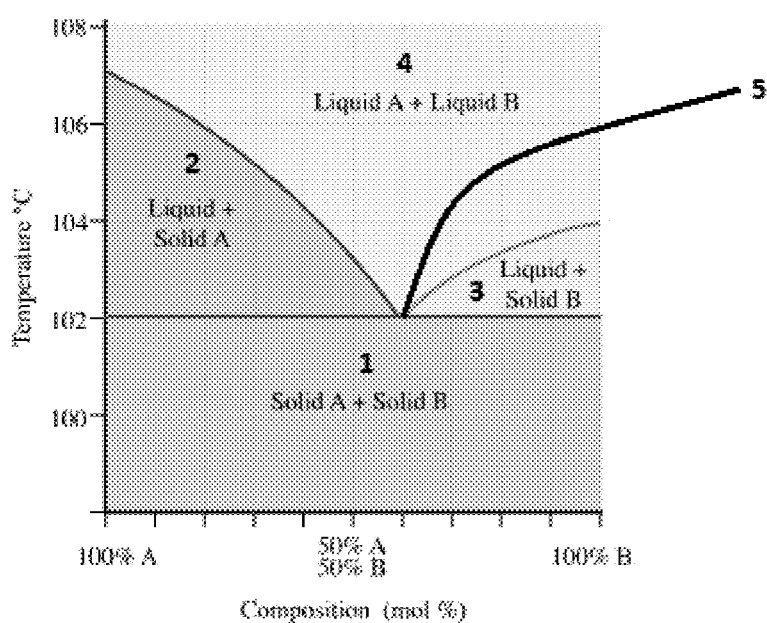
FIG. 1 illustrates a generic phase diagram.

FIG. 1 illustrates a generic phase diagram for a mixture of generic compounds 'A' and 'B' to help illustrate the concept of a eutectic point for a DES. As shown in FIG. 1, a first region 1 is defined by a solid-in-solid mixture of compounds 'A' and 'B'. As shown in FIG. 1, for example, any mixture ratio for compounds 'A' and 'B' at a temperature below 102° C. will be a solid-in-solid mixture. A second region 2 illustrates conditions in which the compound 'A' will be solid but compound 'B' will be in a liquid or melt state. A third region 3 illustrates conditions in which the compound 'B' will be solid but compound 'A' will be in a liquid or melt state. A fourth region 4, illustrates conditions in which compounds 'A' and 'B' are both in a liquid or melt state. FIG. 1 also shows the eutectic point 5, which is the point in a phase diagram indicating the chemical composition and temperature corresponding to the lowest melting/freezing point of a mixture of components.

In accordance with certain embodiments of the invention, the polymer network may comprise a cross-linked three-dimensional polymer network. In accordance with certain embodiments of the invention, the polymer network (e.g., cross-linked or cured) is compatible with the DES. The cross-linked three-dimensional polymer network, for example, may comprise the reaction product of a plurality of monomers including at least a first monomer comprising multiple thiol functional groups and at least a second monomer comprising multiple vinyl functional groups; wherein a number of thiol functional groups is greater than or equal to 2; a number of the vinyl functional groups is greater than or equal to 2; and a sum of the thiol functional groups and the vinyl groups across the plurality of monomers is at least greater than or equal to 5. Stated somewhat differently, the cross-linked three-dimensional polymer network based on thiol-ene systems may comprise at least one multifunctional thiol and one multifunctional vinyl compound, in which the thiol functionality is greater than or equal to 2, the vinyl functionality is greater than or equal to 2 (where an alkyne counts as 2 functional units), and the sum of the functionality across all monomers is at least greater than or equal to 5. In accordance with certain embodiments of the invention, the cross-linked three-dimensional polymer network may comprise the reaction product of the first monomer, the second monomer, and a third monomer including at least two (2) thiol functional groups, wherein the first monomer and the third monomer are different. In accordance with certain embodiments of the invention, the each of the first monomer, the second monomer, and the third monomer may be substantially water soluble.

In accordance with certain embodiments of the invention, the cross-linked three-dimensional polymer network may comprise the reaction product of at least a first monomer including an acrylate or methacrylate functional group and a second monomer or oligomer including at least two (2) free-radically polymerizable functional groups. In accordance with certain embodiments of the invention, the at least two (2) free-radically polymerizable functional groups may independently from each other comprise, for example, an acrylate or methacrylate group, an allylic group, an alkynyl, a styrenic group, a vinyl ester, a vinyl amide, a vinyl amine, a maleate group, a fumarate group, a vinyl ether group, an acrylamide group, a methacrylamide group, an itaconate group, or a norbornene group. In accordance with certain embodiments of the invention, at least one of the first monomer and the second monomer includes poly(ethylene glycol), poly(propylene glycol), or hydroxyl functionality.

In accordance with certain embodiments of the invention, the cross-linked three-dimensional polymer network may comprise the reaction product of a variety of monofunctional monomers, difunctional monomers (e.g., cross-linkers), trifunctional monomers (e.g., cross-linkers), higher functional monomers (e.g., cross-linkers), and solvents/additives. Example monofunctional monomers include p-hydroxystyrene, 2-hydroxyethyl (meth)acrylate, hydroxypropyl (meth) acrylate, N-(hydroxymethyl) (meth)acrylamide, N-hydroxyethyl (meth)acrylamide, glycerol (meth)acrylate, hydroxybutyl (meth)acrylate, N,N-dimethylacrylamide, N-vinyl pyrrolidinone, 2-allyloxyethanol, (meth)acrylic acid, itaconic acid, 2-carboxyethyl (meth) acrylate, poly(ethylene glycol) (meth)acrylate, poly(ethylene glycol) methyl ether (meth)acrylate, poly(ethylene glycol) ethyl ether (meth)acrylate, poly(ethylene glycol) phenyl ether (meth)acrylate, ethylene glycol methyl ether (meth)acrylate, ethylene glycol phenyl ether (meth)acrylate, diethylene glycol ethyl ether (meth)acrylate, poly(ethylene glycol) (meth) acrylate, diethylene glycol (meth)acrylate, triethylene glycol (meth)acrylate, tetraethylene glycol (meth)acrylate, diethylene glycol methyl ether (meth)acrylate, triethylene glycol methyl ether (meth)acrylate, and tetraethylene glycol methyl ether (meth)acrylate.

Example difunctional monomers include allyl (meth) acrylate, glycidyl methacrylate, ethylene glycol dicyclopentyl ether (meth)acrylate, triethylene glycol divinyl ether, poly(ethylene glycol) diacrylamide, poly(ethylene glycol) di(meth)acrylate, ethylene glycol di(meth)acrylate, diethylene glycol di(meth)acrylate, triethylene glycol di(meth) acrylate, tetraethylene glycol di(meth)acrylate, propanediol di(meth)acrylate, 1,4-butanediol di(meth)acrylate, 1,5-pentanediol di(meth)acrylate, 1,6-hexanediol di(meth)acrylate, 1,10-bis(acryloyloxy)decane, 1,12-dodecanediol di(meth) acrylate, poly(silicone-alt-PEG) di(meth)acrylate, poly(propylene glycol) di(meth)acrylate, bisphenol A propoxylate di(meth)acrylate, neopentylglycol propoxylate di(meth) acrylate, glycerol ethoxylate-co-propoxylate di(meth)acrylate, propylene glycol di(meth)acrylate, pentaerythritol propoxylate di(meth)acrylate, tri(propylene glycol) di(meth) acrylate, and diurethane dimethacrylate (DUDMA).

Example trifunctional monomers include 1,3,5-triallyl-2,4,6(1H,3H,5H)-trione, 2,4,6,-triallyloxy-1,3,5,triazine, trimethylolpropane propoxylate tri(meth)acrylate, glycerol propoxylate tri(meth)acrylate, polycaprolactone tri(meth) acrylate (PCLTMA), tris-(4-hydroxyphenyl)ethane tri(meth) acrylate, trimethylolpropane ethoxylate tri(meth)acrylate, glycerol ethoxylate tri(meth)acrylate, and pentaerythritol ethoxylate tri(meth)acrylate.

Higher functional monomers (crosslinkers) include ethylenediamine tetrakis(ethoxylate-block-propoxylate) tetra (meth)acrylate, and pentaerythritol propoxylate tetra(meth) acrylate.

Example solvents/additives include ethylene glycol, diethylene glycol, triethylene glycol, tetraethylene glycol, ethylene glycol monomethyl ether, diethylene glycol monomethyl ether, triethylene glycol, tetraethylene glycol monomethyl ether, poly(propylene glycol), carbonate solvents, and plasticizers. In accordance with certain embodiments of the invention, a solvent can be added to reduce the viscosity of the pre-cured GPE compositions, which facilitates penetration into the pores of the electrode and also improves conductivity.

In accordance with certain embodiments of the invention, the GPE composition may be provided in the form of a water-swellable hydrogel. Alternatively, the GPE composition may not be water-swellable, or even a hydrogel. For instance, the GPE composition may be anhydrous (e.g., devoid of water prior to an initial use). Anhydrous GPE compositions, for example, may be particularly suitable for use with water sensitive electrodes such as graphite and lithium metal. In accordance with certain embodiments of the invention, the GPE composition may be provided in the form of film (e.g., free standing film) having a thickness from 10 to 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In accordance with certain embodiments of the invention, the cross-linked three-dimensional polymer network comprises from about 20% to about 80% by weight of the GPE composition, and the DES comprises from about 20% to about 80% by weight of the GPE composition. For example, the cross-linked three-dimensional polymer network may comprise at most about any of the following: 80, 75, 70, 65, 60, 55, 50, 45, and 40% by weight of the GPE composition and/or at least about any of the following: 20, 25, 30, 35, 40, 45, and 50% by weight of the GPE composition. Additionally or alternatively, the DES may comprise at most about any of the following: 80, 75, 70, 65, 60, 55, 50, 45, and 40% by weight of the GPE composition and/or at least about any of the following: 20, 25, 30, 35, 40, 45, and 50% by weight of the GPE composition.

In accordance with certain embodiments of the invention the DES comprises at least one hydrogen bond donor and at least one hydrogen bond acceptor. For instance, the at least one hydrogen bond acceptor may include at least one localized lone electron pair in accordance with certain embodiments of the invention. The at least one hydrogen bond acceptor, for example, may comprise a lithium salt, a zinc salt, or combination thereof. By way of example only, the at least one hydrogen bond acceptor may comprise lithium bis(trifluoromethanesulfonyl)imide (LiTFSI), lithium trifluoromethanesulfonate (LiOTf), lithium chloride (LiCl), lithium hexafluorophosphate (LiPF6), a lithium polysulfide, lithium perchlorate (LiCl4), lithium bromide (LiBr), lithium iodide (LiI), lithium thiocyanate (LiSCN), lithium tetrafluoroborate (LiBF4), lithium hexafluoroarsenate (LiAsF6), lithium bis(oxalate)borate (LiBOB), LiFAP [LiPF3(CF2CF3)3], zinc trifluoromethanesulfonate (Zn (OTf)2), or zinc di[bis(trifluoromethanesulfonyl)imide)] Zn(TFSI)$_2$, and combinations thereof.

Additionally or alternatively, the hydrogen bond acceptor may comprise a salt having a positively charged nitrogen atom, a positively charged phosphorous atom, an alcohol, a carboxylic acid, a primary amine, a secondary amine, a tertiary amine, or combinations thereof. Non-limiting examples of hydrogen bond acceptors include the following:

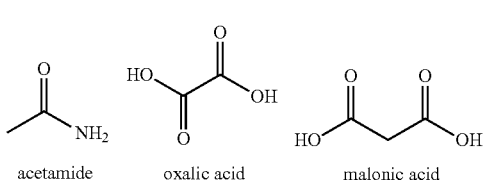

acetamide     oxalic acid     malonic acid

-continued
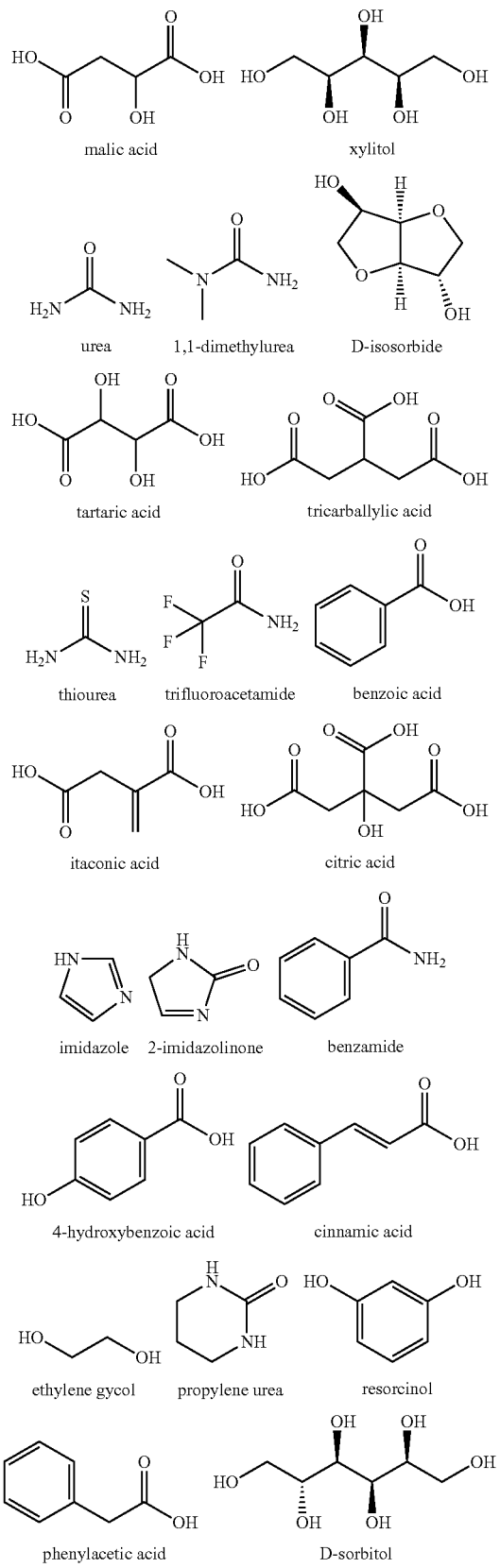
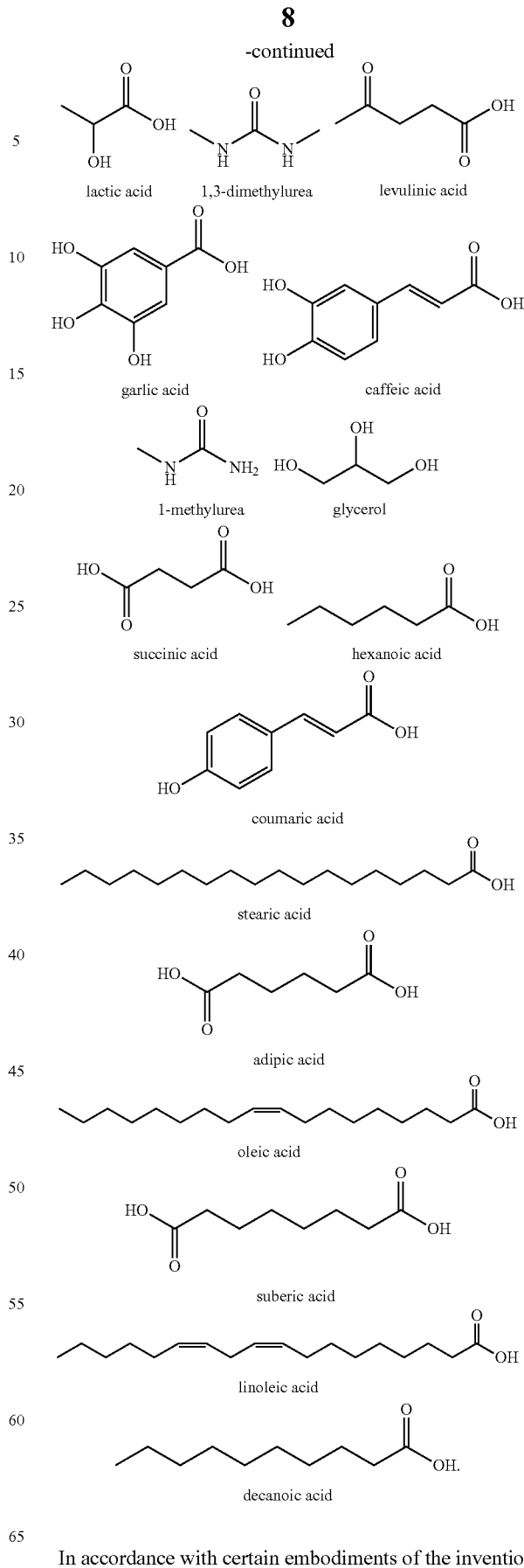
In accordance with certain embodiments of the invention, the at least one hydrogen bond donor comprises a hydrogen atom bonded to a heteroatom (e.g., a nitrogen atom, an oxygen atom, or a fluorine atom). For example, the at least one hydrogen bond donor may comprise a carboxylic acid, an amide, and/or a urea. Non-limiting examples of hydrogen bond donors include the following:

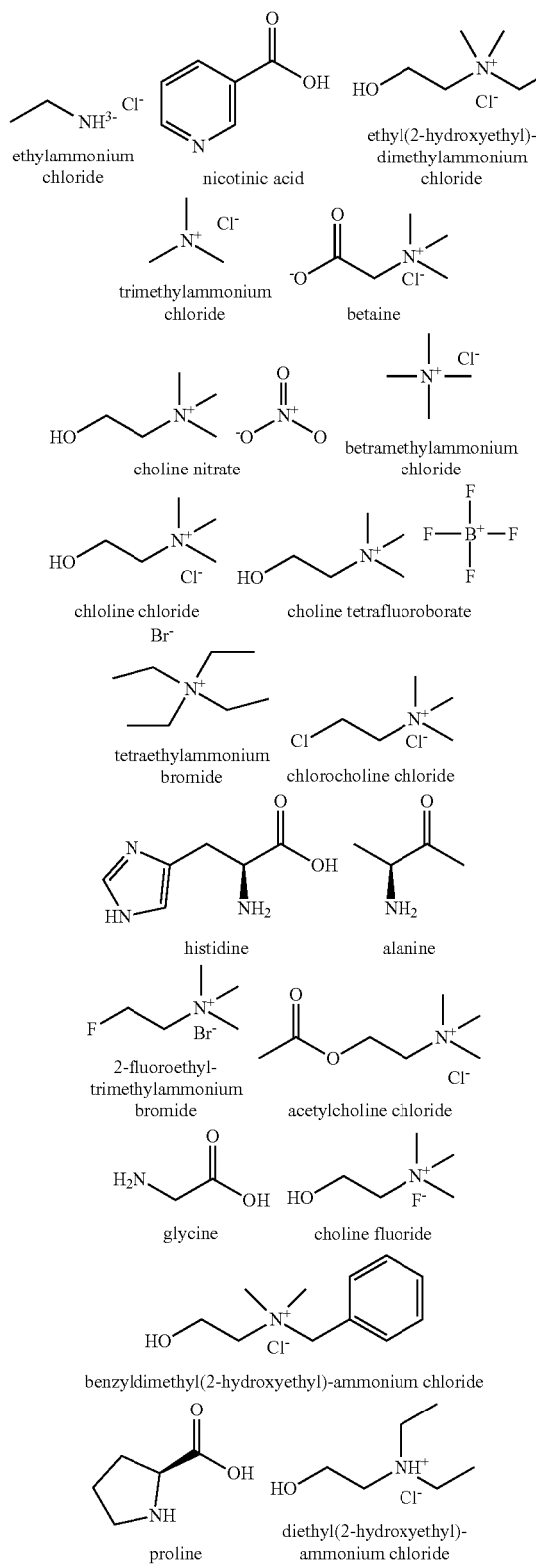

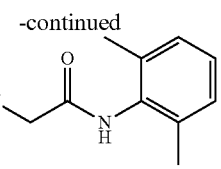

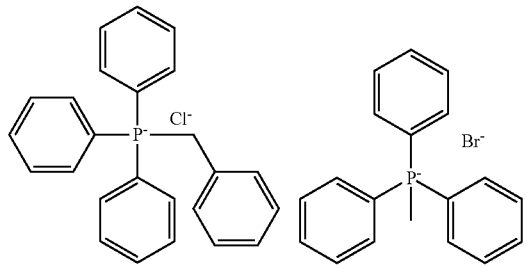

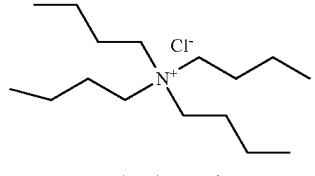

In accordance with certain embodiments of the invention, the DES may comprise one or more of the following example combinations of a hydrogen bond donor with a hydrogen bond acceptor: N-methylacetamide-LiTFSI, trifluoroacetamide-LiTFSI, N-methyltrifluoroacetamide, urea-LiTFSI, N-methylurea-LiTFSI, N,N-dimethylurea-LiTFSI, N,N'-dimethylurea-LiTFSI, N,N,N'-trimethylurea-LiTFSI, ethylene glycol-LiTFSI, Urea-$ZnCl_2$ plus LiTFSI (e.g., used with Zn metal anode, LMO cathode), choline chloride-ethylene glycol (1:3) plus 5 wt. % LiTFSI (conductivity data, 1.4 mS/cm), choline chloride-ethylene glycol (1:3) plus 10 wt. % LiTFSI (conductivity data, 1.6 mS/cm), choline chloride-ethylene glycol (1:3) plus 20 wt. % LiTFSI (conductivity data, 0.8 mS/cm), and choline chloride-lactic acid (1:2) plus 5 wt. % LiTFSI (conductivity data, 1.25 mS/cm).

In accordance with certain embodiments of the invention, the at least one hydrogen bond donor comprises from about 10 mole % to about 90 mole % of the DES, and the at least one hydrogen bond acceptor comprises from about 10 mole % to about 90 mole % of the DES. For example, the at least one hydrogen bond donor may comprise at most about any of the following: 90, 85, 80, 75, 70, 65, 60, 55, 50, 45, and 40 mole % of the DES and/or at least about any of the following: 20, 25, 30, 35, 40, 45, and 50 mole % of the DES. Additionally or alternatively, the hydrogen bond acceptor may comprise at most about any of the following: 90, 85, 80, 75, 70, 65, 60, 55, 50, 45, and 40 mole % of the DES and/or at least about any of the following: 20, 25, 30, 35, 40, 45, and 50 mole % of the DES.

In accordance with certain embodiments of the invention, the eutectic point is defined by a first amount of the at least one hydrogen bond donor (e.g., mole % of the hydrogen bond donor) and a second amount of the hydrogen bond acceptor (e.g., mole % of the hydrogen bond acceptor) as generically illustrated in FIG. 1, and the DES comprises a mixture of: (i) the at least one hydrogen bond donor present within about 30% (e.g. within about 20%, 10%, 5%, or 3%) of the first amount, and/or (ii) the at least one hydrogen bond acceptor within about 30% (e.g. within about 20%, 10%, 5%, or 3%) of the second amount.

In accordance with certain embodiments of the invention, the electrolyte composition includes an amount of water (e.g., prior to an initial charge) comprising from about 0.5% to about 30% by weight of the electrolyte composition. For instance, the electrolyte composition may include an amount of water (e.g., prior to an initial charge) from at least about any of the following: 0.5, 1, 3, 5, 10, 15, and 20% by weight of the electrolyte composition and/or at most about any of the following: 30, 25, 20, 15, and 10% by weight of the electrolyte composition. Alternatively, the electrolyte composition may be devoid of water (e.g., prior to an initial charge). Such anhydrous DESs may be particularly useful in electrochemical cells made from water sensitive electrolytes, such as graphite or lithium metal.

The GPE composition, in accordance with certain embodiments of the invention, may comprise a conductivity of at least $1 \times 10^{-4}$ S/cm, at least $5 \times 10^{-4}$ S/cm, or at least $1 \times 10^{-3}$ S/cm.

The GPE composition, in accordance with certain embodiments of the invention, may comprise a free-radical initiator (e.g., chemical initiator, thermal initiator, photoinitiator, or redox initiation system), in which the free radical initiator may be present from about 0.1 to about 10 wt. % of the total monomer mass in the composition prior to being radically-cured for formation of the polymer network. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.1, 0.25, 0.5, 0.75, 1, 1.25, 1.5, 1.75, 2, 2.25, and 2.5 wt. % of the total monomer mass in the composition prior to being radically-cured.

In another aspect, embodiments of the present invention provide an electrochemical cell including an anode, a cathode, and a GPE positioned between and in contact with the anode and the cathode. In accordance with certain embodiments of the invention, the GPE includes a GPE-composition comprising a polymer network and an electrolyte composition absorbed by the GPE. In accordance with certain embodiments of the invention, the electrolyte composition comprises a DES as described herein. In accordance with certain embodiments of the invention, the anode comprises an anode-composition comprising an active anode species and the cathode comprises a cathode-composition comprising an active cathode species.

As used herein, the term "active anode species" may comprise any electrochemically active species associated with the anode. For example, the anode may comprise graphite, lithium, zinc, silicon, tin oxides, antimony oxides, or a lithium-containing material, such as lithium titanium oxide. In accordance with certain embodiments of the invention, the anode active species may comprise lithium metal or a lithium alloy. As used herein, the term "active cathode species" may comprise any electrochemically active species associated with the cathode. For example, the cathode may comprise a lithium metal oxide (e.g., a lithium cobalt oxide, lithium-nickel oxide, a lithium-manganese oxide, etc.), or a sulfur-containing material (e.g., elemental sulfur).

Figure 2:
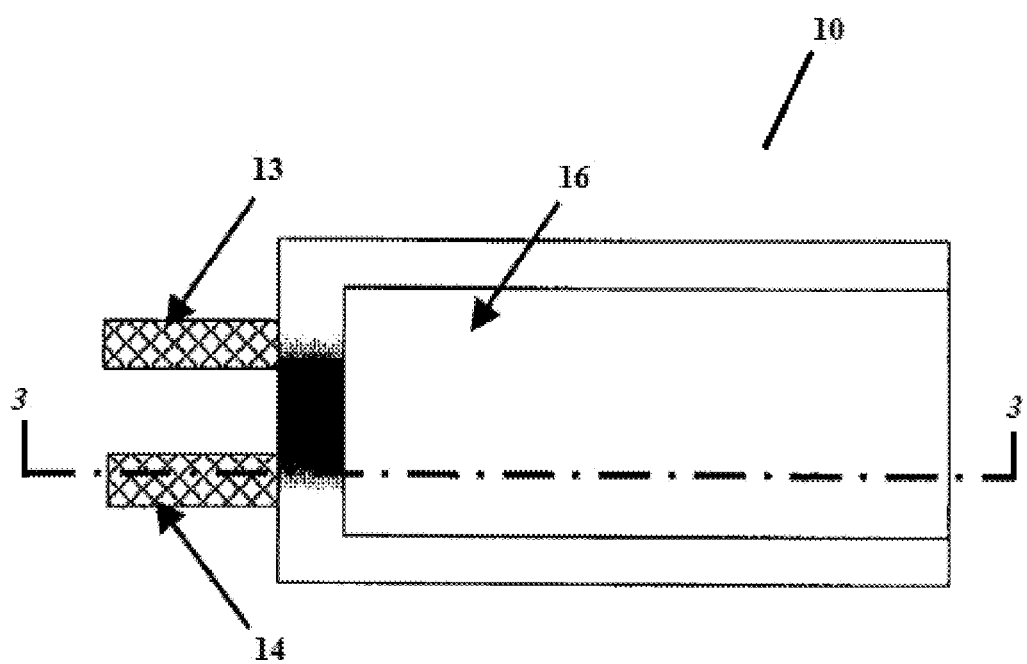
FIG. 2 illustrates an electrochemical cell according to certain embodiments of the invention.
Figure 3:
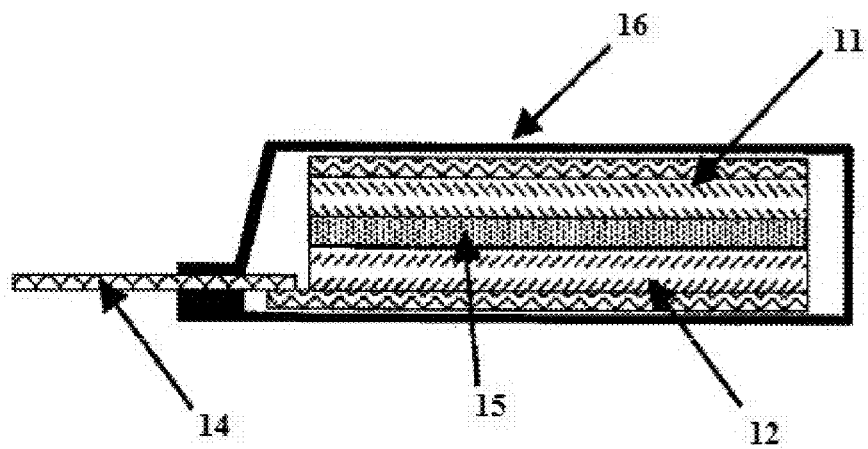
FIG. 3 illustrates a cross-sectional view of the electrochemical cell of FIG. 2 according to certain embodiments of the invention.

FIG. 2, for example, illustrates an exterior of an electrochemical cell 10 according to certain embodiments of the invention. As shown in FIG. 2, the electrochemical cell 10 may comprise battery container or housing 16, cathode lead terminal 13 and anode lead terminal 14. FIG. 3 illustrates a cross-sectional view of the electrochemical cell 10 of FIG. 2. As shown in FIG. 3, the electrochemical cell comprises cathode 11, anode 12, and a GPE 15 that is disposed between and in contact with the cathode 11 and anode 12. In accordance with certain embodiments of the invention, the GPE comprises the polymer network and the electrolyte composition comprising a DES, in which the electrolyte composition may be devoid of water (e.g., prior to an initial charge) or include a minor amount of water (e.g., prior to an initial charge) as noted above.

In accordance with certain embodiments of the invention, the electrochemical cells may be provided in a variety of different shapes and forms and may comprise primary and secondary electrochemical cells. For instance, electrochemical cells in accordance with certain embodiments of the invention may comprise a rigid or non-rigid configuration. Non-rigid configurations, for example, may comprise an electrochemical cell that may be flexible such that the electrochemical cell's shape or configuration may be adjustable (e.g., movable between linear/flat configuration to an arcuate configuration) prior to or during operation. In accordance with certain embodiments of the invention, the electrochemical cells (e.g., aqueous electrochemical cells) may include one or more electrodes (e.g., anode and/or cathode) including a passivation layer as described herein.

Figure 4:
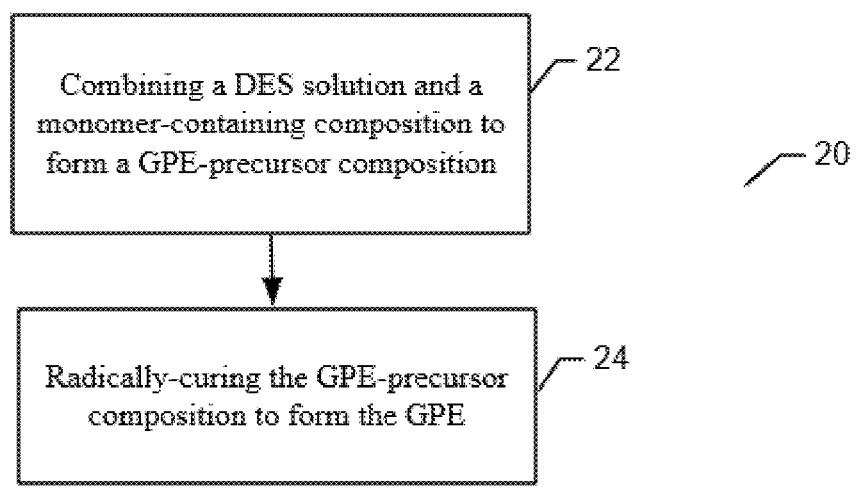
FIG. 4 illustrates a flow diagram of a method for forming an electrode in accordance with certain embodiments of the invention.

In another aspect, embodiments of the present invention provide a method of forming a GPE. FIG. 4, for example, illustrates a flow diagram of a method 20 for forming a GPE that may include combining a DES solution and a monomer-containing composition to form a GPE-precursor composition at operation 22. The method 20 may also comprise radically-curing the GPE-precursor composition to form the GPE at operation 24.

In accordance with certain embodiments of the invention, the method of forming a GPE may further comprise adding an amount of water to the DES solution or adding an amount of water to the GPE-precursor composition. The amount of water added, as noted above, may comprise from at least about any of the following: 0.5, 1, 3, 5, 10, 15, and 20% by weight of the GPE-precursor composition and/or at most about any of the following: 30, 25, 20, 15, and 10% by weight of the GPE-precursor composition. Alternatively, the GPE-precursor composition may be devoid of water (e.g., prior to an initial charge). Such an anhydrous GPE-precursor composition may be particularly useful in formation of electrochemical cells made from water sensitive electrolytes, such as graphite or lithium metal. In accordance with certain embodiments of the invention, the monomer-containing composition may comprise a solution, colloidal suspension, or suspension.

In accordance with certain embodiments of the invention, the method of forming a GPE may further comprise depositing the GPE-precursor composition onto a first surface of a substrate prior to radically-curing the GPE-precursor composition to form the GPE. For example, the first substrate may comprise an electrode such that the GPE-precursor composition is deposited onto a first surface of an electrode prior to radically-curing the GPE-precursor composition to form the GPE. In accordance with certain embodiments of the invention, the method may comprise depositing the GPE-precursor composition onto a non-electrode substrate to form a free-form or stand-alone GPE. In accordance with certain embodiments of the invention, the method may comprise forming a large sheet of a free-form or stand-alone GPE and subsequently forming a plurality of independent free-form or stand-alone GPEs from the large sheet, such as by cutting or punching out individual GPEs from the large sheet.

In accordance with certain embodiments of the invention, the method may comprise positioning a porous battery separator within the body of the GPE-precursor composition prior to radically curing the GPE precursor composition. In this regard, the resulting GPE may comprise a porous battery separator at least partially (or completely) embedded within the GPE. For instance, the resulting GPE may include a porous battery separator that is completely surrounded by the polymer network of the GPE.

In accordance with certain embodiments of the invention, the method may comprise placing a layer of the GPE precursor composition on top of at least a portion of the first surface of the electrode and applying a slight pressure or external force (e.g., via a direct air stream or weight) to the GPE precursor composition to facilitate penetration of the GPE precursor composition into the pores of the body of the electrode. In accordance with certain embodiments of the invention, the application of pressure to the passivation-composition may comprise a positive pressure (e.g., via a direct air stream or weight) or a negative pressure (e.g., via application of a vacuum to draw or pull the GPE precursor composition into the body or pores of the electrode). For example, the electrode may comprise a porous structure having a plurality of pores extending from the surface of the electrode into the body of the electrode. In accordance with certain embodiments of the invention, the GPE precursor composition may be allowed or forced (e.g., applying a slight pressure or external force onto the GPE precursor composition to facilitate entry of the GPE precursor composition into the pores) into and fill at least a portion of the pores to provide a more conformal coating layer of the GPE precursor composition. In accordance with certain embodiments of the invention, the GPE precursor composition may be subjected to a curing operation (e.g., radically cured) after the GPE precursor composition has filled and/or entered at least a portion of the pores of the electrode to provide a conformally coated GPE layer.

Figure 5:
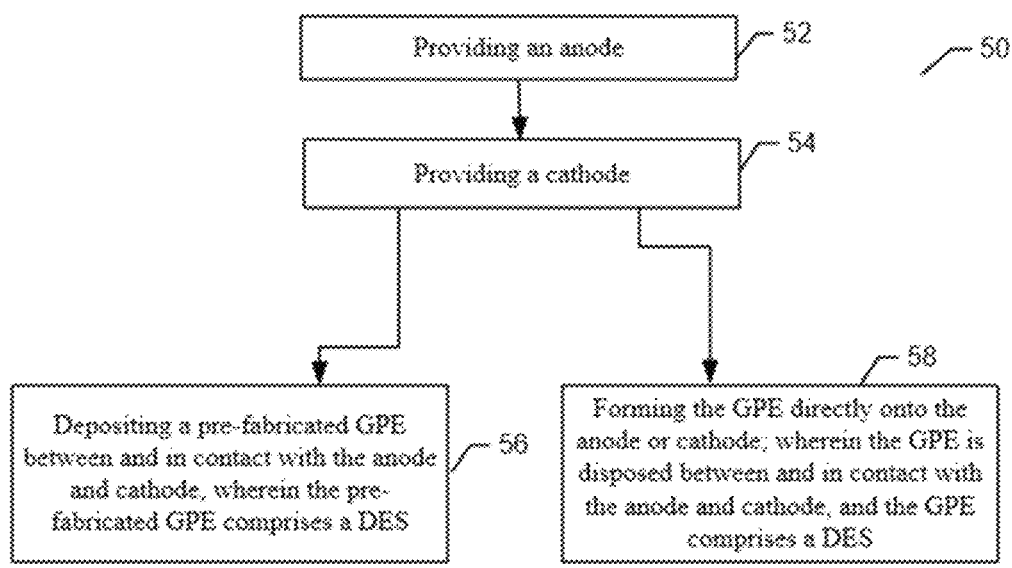
FIG. 5 illustrates a flow diagram of a method for forming an electrochemical cell in accordance with certain embodiments of the invention.

In another aspect, embodiments of the present invention provide a method of forming an electrochemical cell. FIG. 5, for example, illustrates a flow diagram of a method 50 of forming an electrochemical cell that may include providing an anode at operation 52, providing a cathode at operation 54, and (i) depositing a pre-fabricated GPE between and in contact with the anode and the cathode in which the pre-fabricated GPE comprises a DES at operation 56, or (ii) forming the GPE directly onto the anode or the cathode in which the GPE is disposed between and in contact with the anode and the cathode and the GPE comprises a DES at operation 58.

In accordance with certain embodiments of the invention, the step of forming the GPE directly on the anode, cathode, or both may comprise coating or depositing a GPE precursor composition on the electrode(s) of choice and radically curing the GPE precursor composition while positioned on the electrode(s) of choice as described above. In accordance with certain embodiments of the invention, the GPE precursor composition may be actively (e.g., via an added external pressure) or passively allowed to penetrate into the pores of the electrode(s) of choice prior to radically curing the GPE precursor composition.

In accordance with certain embodiments of the invention, the method of forming an electrochemical cell may comprise forming a first GPE-layer directly onto the anode and forming a second GPE-layer directly onto the cathode, and further comprising a step of joining the first GPE-layer and the second GPE-layer together such that the first GPE-layer and the second GPE-layer are disposed between the anode and the cathode. In accordance with certain embodiments of the invention, the GPE may be formed or deposited directly on only one of the anode or cathode prior to final formation of the electrochemical cell.

EXAMPLES

The present disclosure is further illustrated by the following examples, which in no way should be construed as being limiting. That is, the specific features described in the following examples are merely illustrative and not limiting.

Example Set 1

Figure 6:
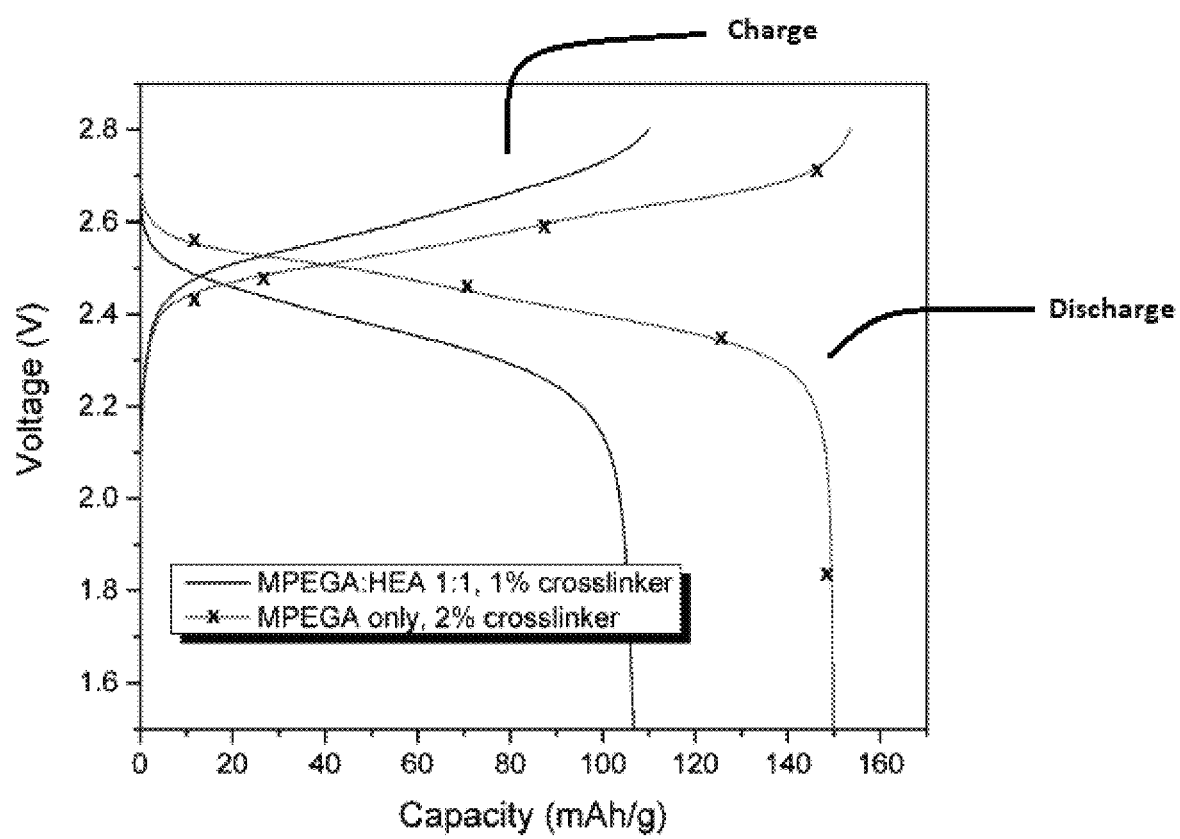
FIG. 6 illustrates the initial charge cycle for two electrochemical cells according to certain embodiments of the invention.

FIG. 6 illustrates the initial charge cycle for two electrochemical cells including a DES-based GPE, in which the only difference between the electrochemical cells was the polymer network of the GPE, where MPEGA is poly(ethylene glycol) methyl ether acrylate and HEA is 2-hydroxyethyl acrylate.

Figure 7:
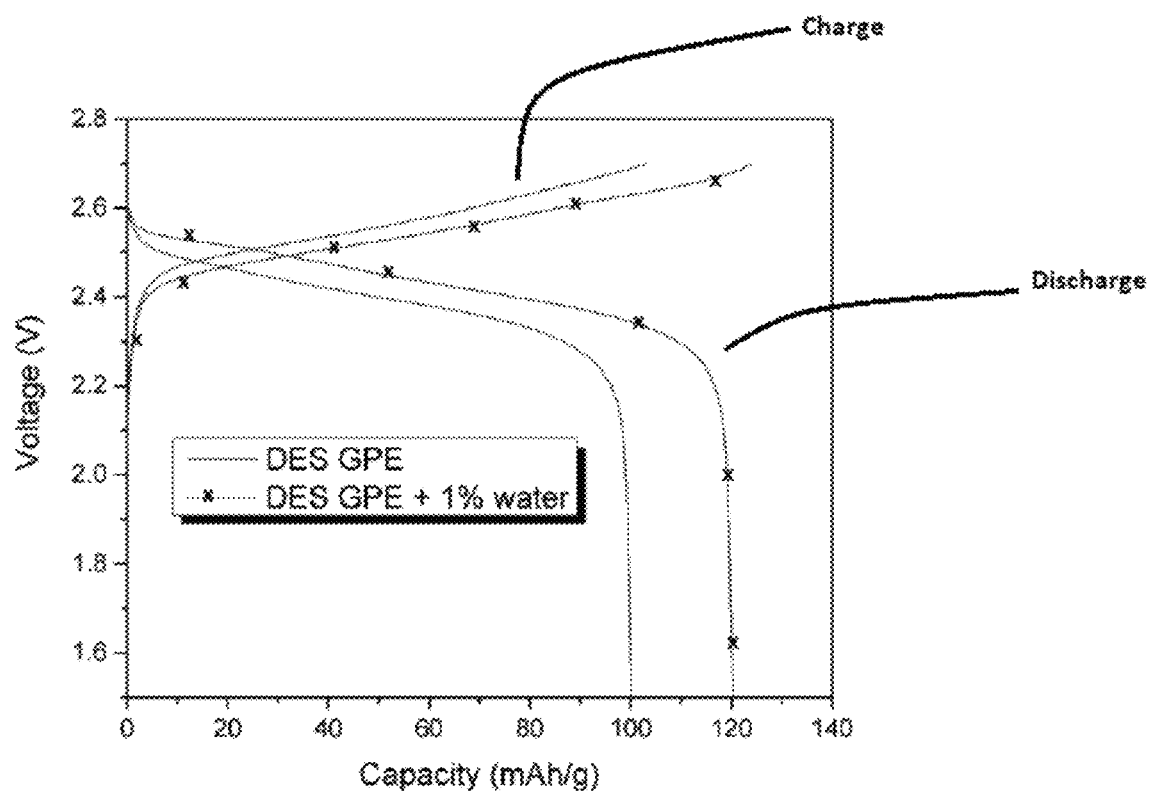
FIG. 7 illustrates the initial charge cycle for two electrochemical cells, in which one of the cells included 1% water in the DES-based GPE according to certain embodiments of the invention.
Figure 8:
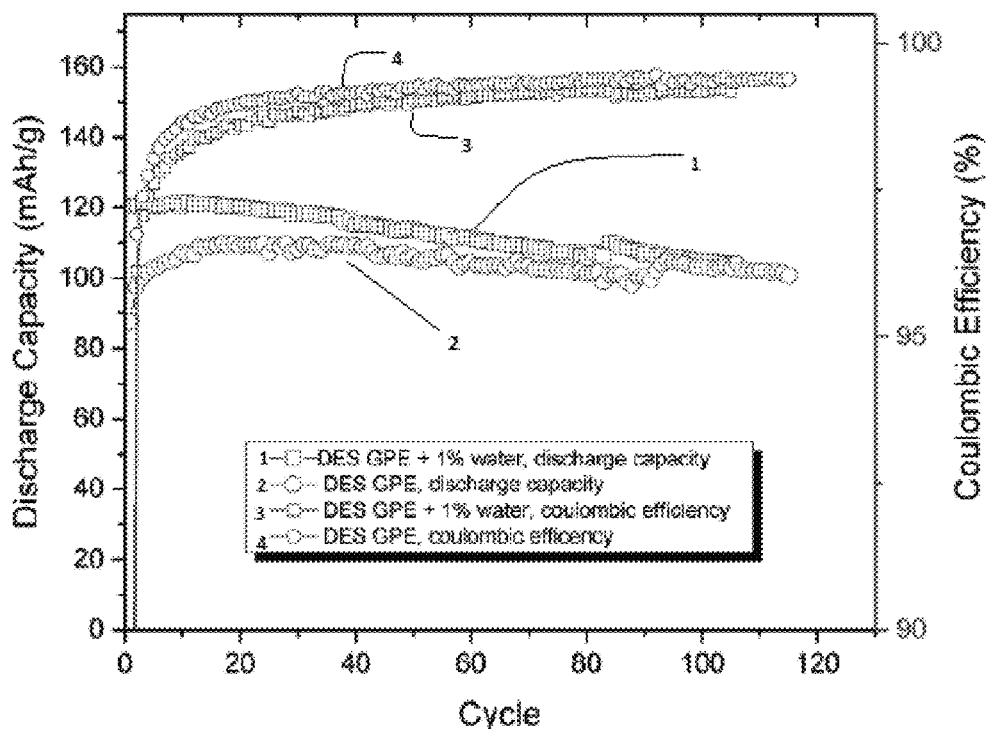
FIG. 8 illustrates discharge capacities vs. cycle number and coulombic efficiency vs. cycle number for a variety of electrochemical cells according to certain embodiments of the invention.

FIG. 7 illustrates the initial charge cycle for two electrochemical cells including a DES-based GPE, in which one of the cells included 1% water in the DES-based GPE. As can be seen in FIG. 7, the addition of water to the DES-based GPE increased the capacity of the electrochemical cell. FIG. 8 illustrates discharge capacities vs. cycle number and coulombic efficiency vs. cycle number for a variety of electrochemical cells including a DES-based GPE. FIG. 8 shows that the addition of water to the DES-based GPE increased the discharge capacity of the electrochemical cell.

Example Set 2

A variety of electrochemical cells including a DES-based GPE as the electrolyte composition were formed for analysis. Each of the DES-based GPEs included a different polymer network based on varying the monomer content forming the DES-based GPE. Table 1 provides a summary of the monomer content utilized to form the polymer network of each of the DES-based GPEs. Each of the DES-based GPEs were generally composed of 70 wt. % DES and 30 wt. % monomer and 0.5 wt. % photoinitiator (i.e., 2,2-dimethoxyphenyl acetophenone—DMPA). The DES composition for each DES-based GPE was 80 mole % N-methylacetamide (NMA) and 20 mole % LiTFSI. All amounts in Table 1 are wt. % based on total monomer mass.

TABLE 1

| Sample | MPEGA | HEA | PEGDA |
|---|---|---|---|
| EGPE-97-0-3 | 97 | 0 | 3 |
| EGPE-74-24-2 | 74 | 24 | 2 |
| EGPE-49.5-49.5-1 | 49.5 | 49.5 | 1 |
| EGPE-24.5-74.5-1 | 42.5 | 47.5 | 1 |
| EGPE-0-99-a | 0 | 99 | 1 |

The structures for the materials used are provided below for ease of reference:

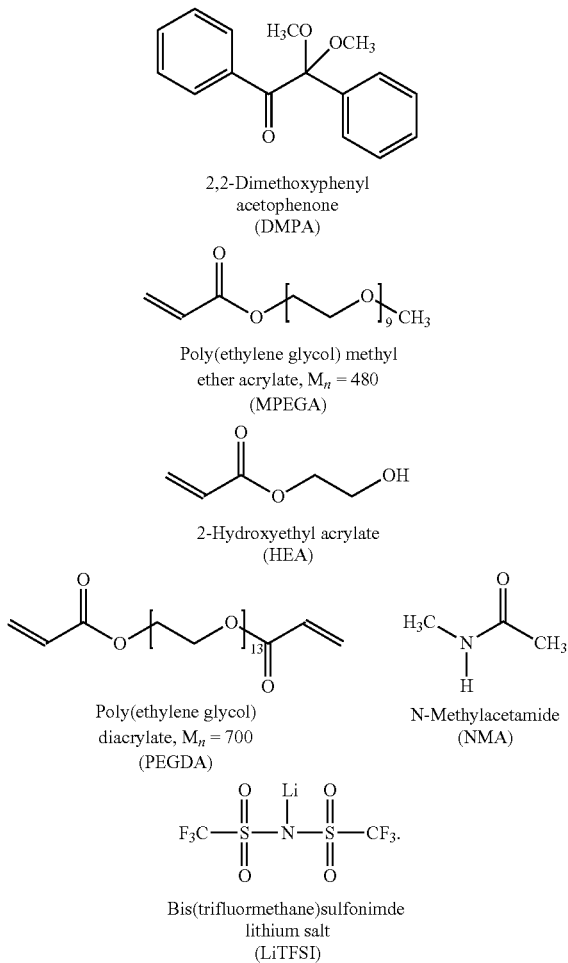

Figure 9:
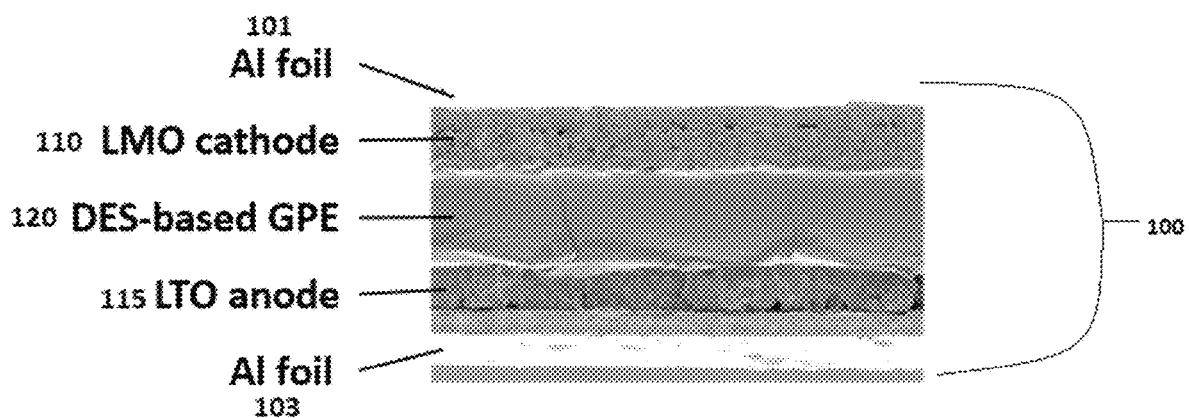
FIG. 9 illustrates a SEM micrograph of a cross-section of an electrochemical cell 100 after curing of the DES-based GPE according to certain embodiments of the invention.

FIG. 9 illustrates a SEM micrograph of a cross-section of an electrochemical cell 100 after curing of the DES-based GPE. As shown in FIG. 9, the electrochemical cell 100 includes two out aluminum foil outer layers 101,103. The electrochemical cell 100 includes LMO cathode 110, a LTO anode 115, and DES-based GPE 120.

Figure 10:
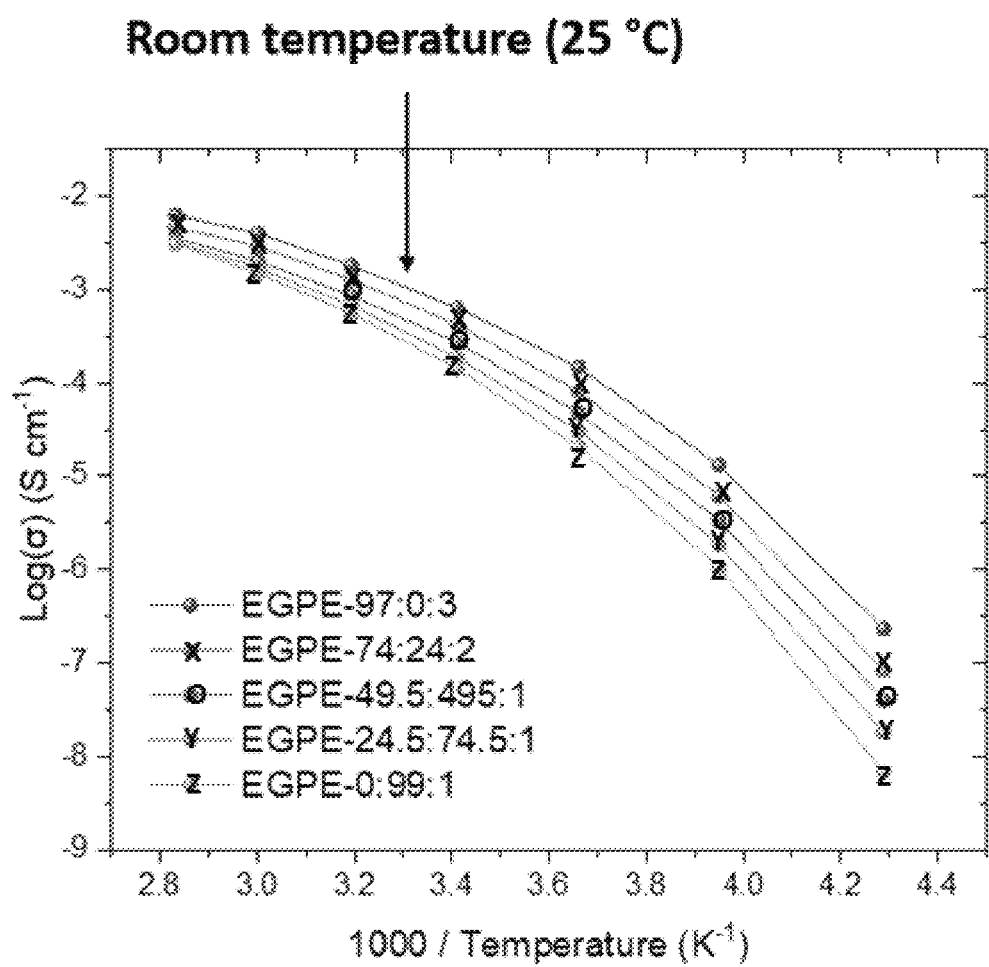
FIG. 10 illustrates a plot that shows the conductivity of DES-based GPEs in accordance with certain embodiments of the invention.

FIG. 10 illustrates a plot that shows the conductivity of each of the DES-based GPEs. Room temperature conductivity is excellent ($10^{-4}$ to $10^{-3}$ S/cm) for each DES-based GPE. FIG. 10 also shows that the GPEs with higher MPEGA content show higher conductivity.

Figure 11:
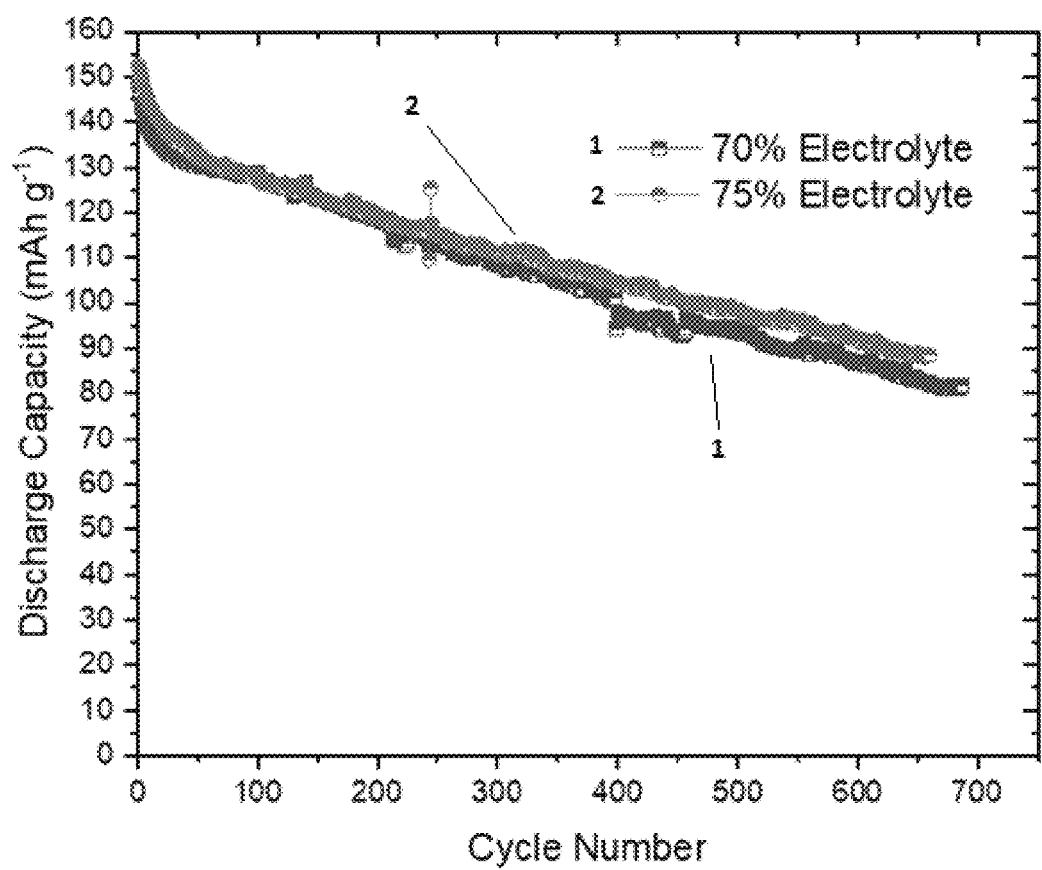
FIG. 11 is a plot of data showing good electrochemical cell cycling for LTO/LMO cells in accordance with certain embodiments of the invention.

FIG. 11 is a plot of data showing good cycling for LTO/LMO electrochemical cells made using EGPE-74-42-2 with 70 wt. % DES and also with 75 wt. % DES, each run at 0.5 C rate. Both electrochemical cells perform well over hundreds of cycles.

Figure 12:
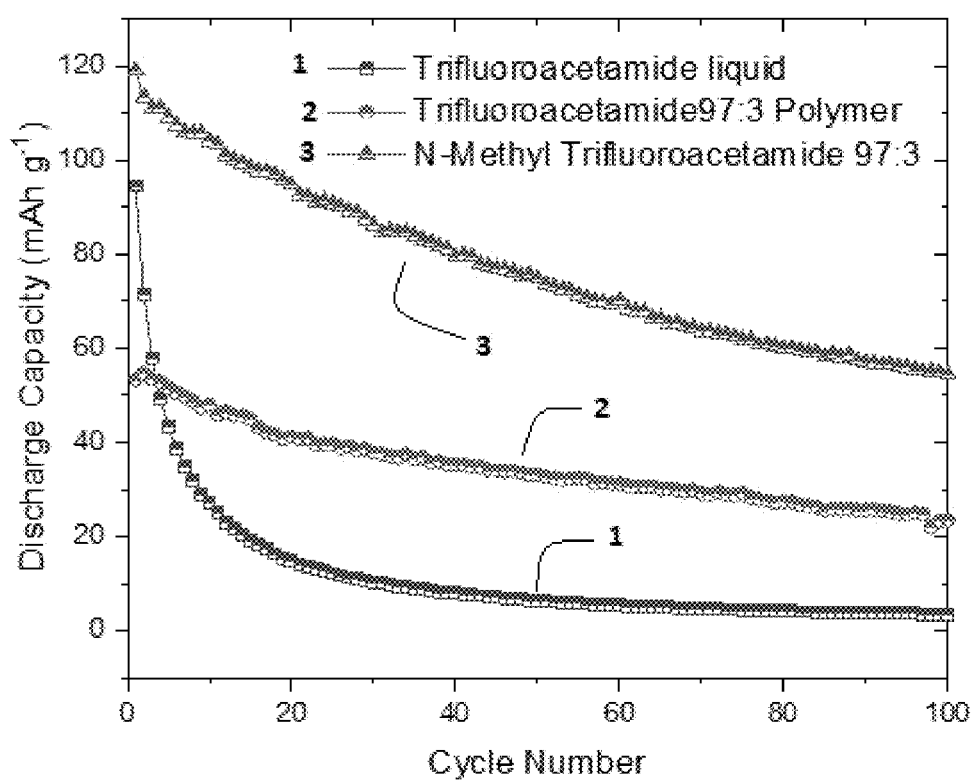
FIG. 12 shows the performance of two electrochemical cells made using fluorinated acetamide derivatives according to certain embodiments of the invention.
Figure 13:
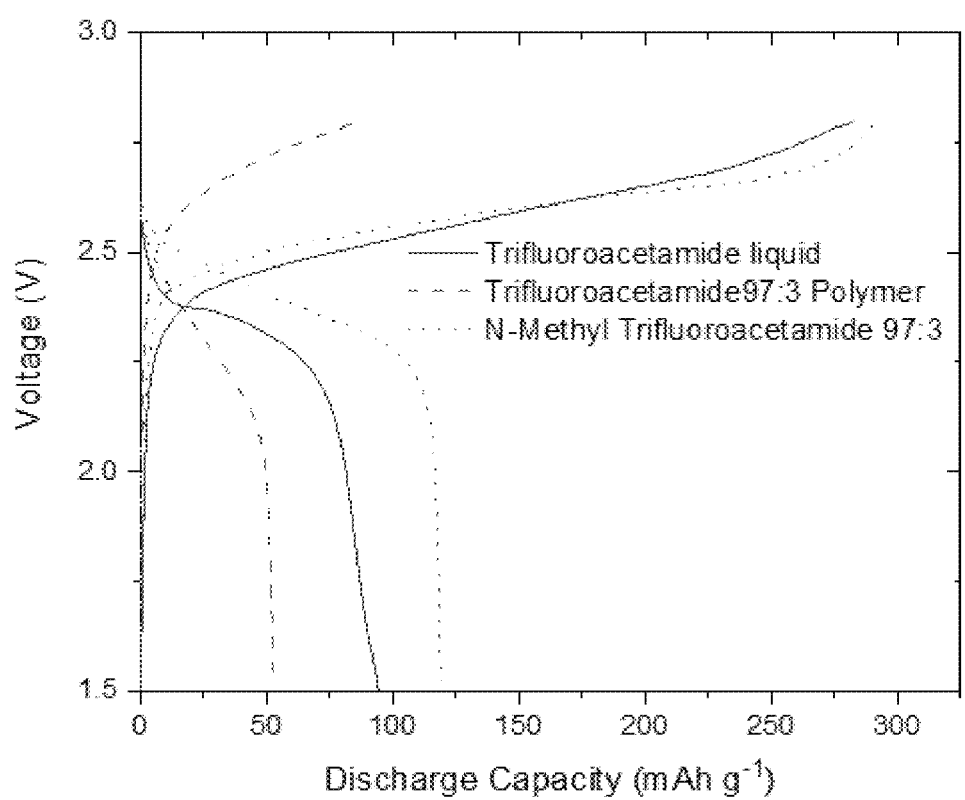
FIG. 13 shows the 1st cycle charge and discharge capacities for electrochemical cells of FIG. 12 according to certain embodiments of the invention.

FIG. 12 shows the performance of two electrochemical cells made using fluorinated acetamide derivatives. The comparison of the data for the use of trifluoroacetamide with the data for the 97:3 (trifluoroacetamide:polymer) electrolyte composition shows that the polymer (EGPE-97-0-3) stabilizes the electrochemical cell performance, exhibiting higher capacity retention vs. the electrochemical cell made using liquid DES only (no gel polymer matrix). The inclusion of an addition N-methyl group (i.e., N-Methyltrifluoroacetamide) dramatically improves first cycle efficiency and overall performance. All electrochemical cells were run at 0.5 C rate, and GPEs were made using EGPE-97-0-3 with 30 wt % polymer. FIG. 13 shows the 1st cycle charge and discharge capacities for electrochemical cells of FIG. 12.

Figure 14:
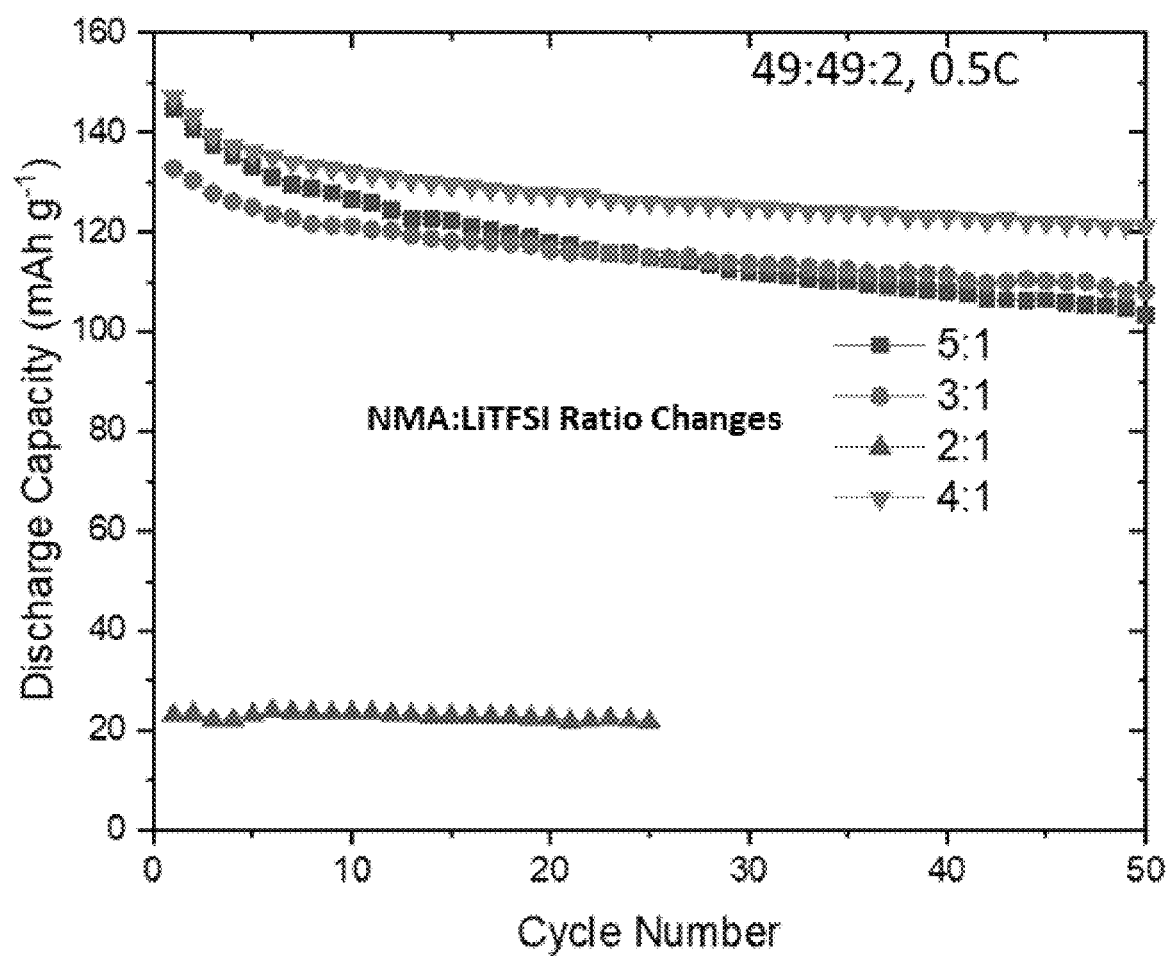
FIG. 14 is a plot showing capacity retention for DES-based GPEs with varying NMA/LiTFSI ratios according to certain embodiments of the invention.
Figure 15:
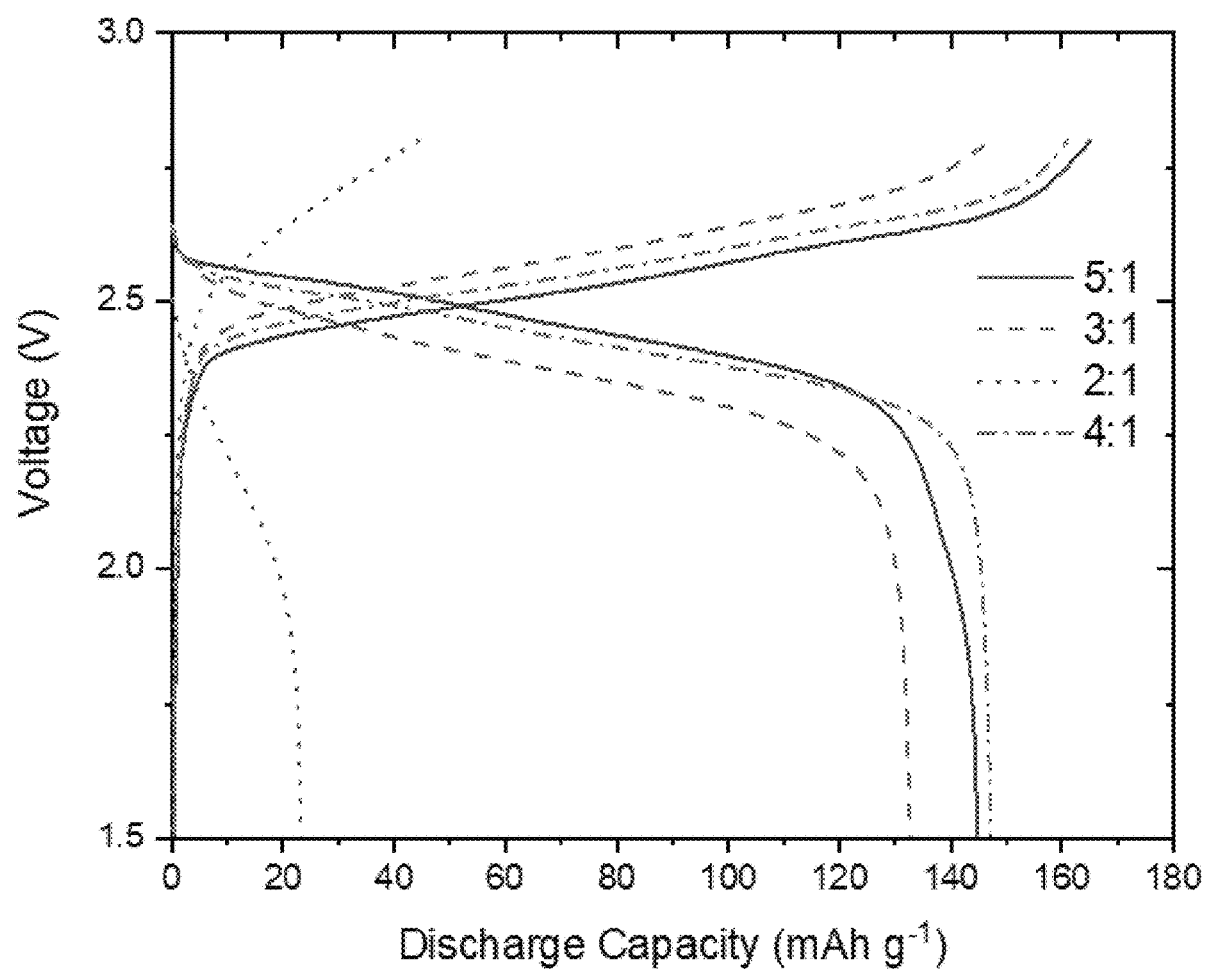
FIG. 15 shows the discharge capacities for the electrochemical cells of FIG. 14 according to certain embodiments of the invention.

FIG. 14 is a plot showing the excellent capacity retention for EGPE-49-49-2 polymer made with DES electrolytes of varying NMA/LiTFSI ratios. The data shows best performance was achieved when the DES composition was closest to the true eutectic compositions (4:1, in this case). All GPEs were 30 wt. % polymer and 70 wt. % DES. Electrochemical cells cycled at 0.5 C rate. FIG. 15 shows the discharge capacities for the electrochemical cells of FIG. 14.

Figure 16:
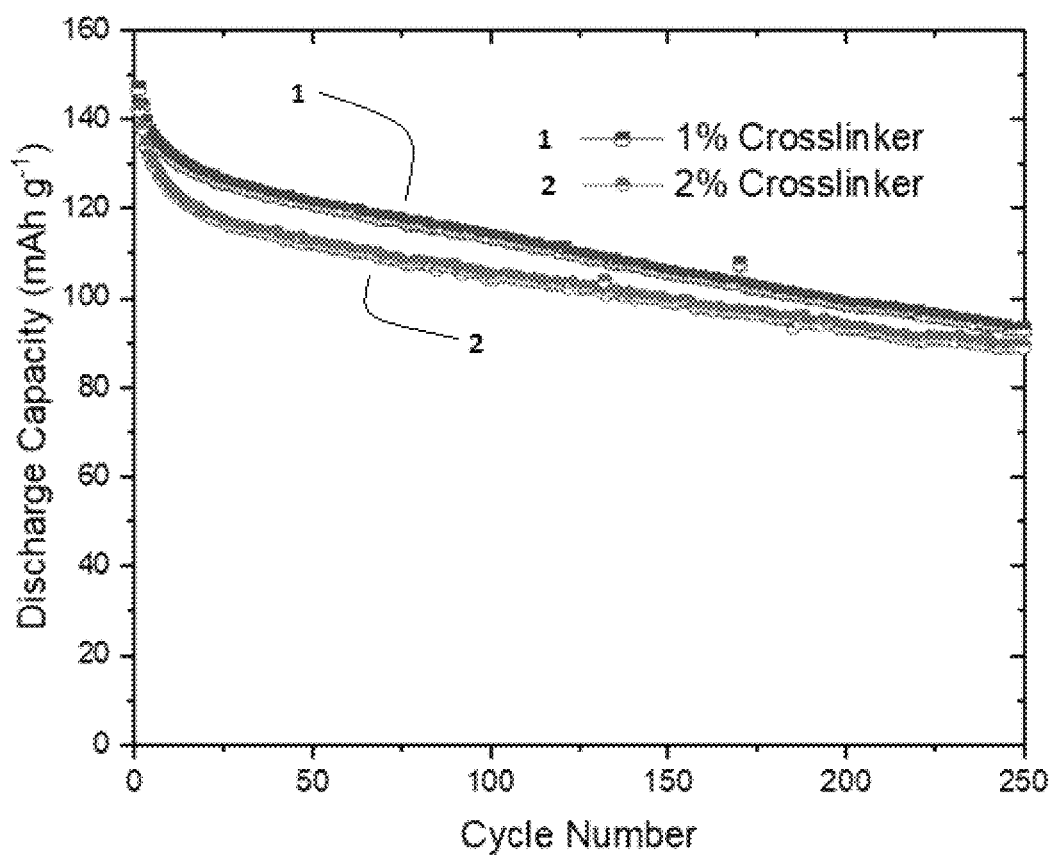
FIG. 16 is a plot showing capacity retention for electrochemical cells made using equal parts of HEA and MPEGA according to certain embodiments of the invention.
Figure 17:
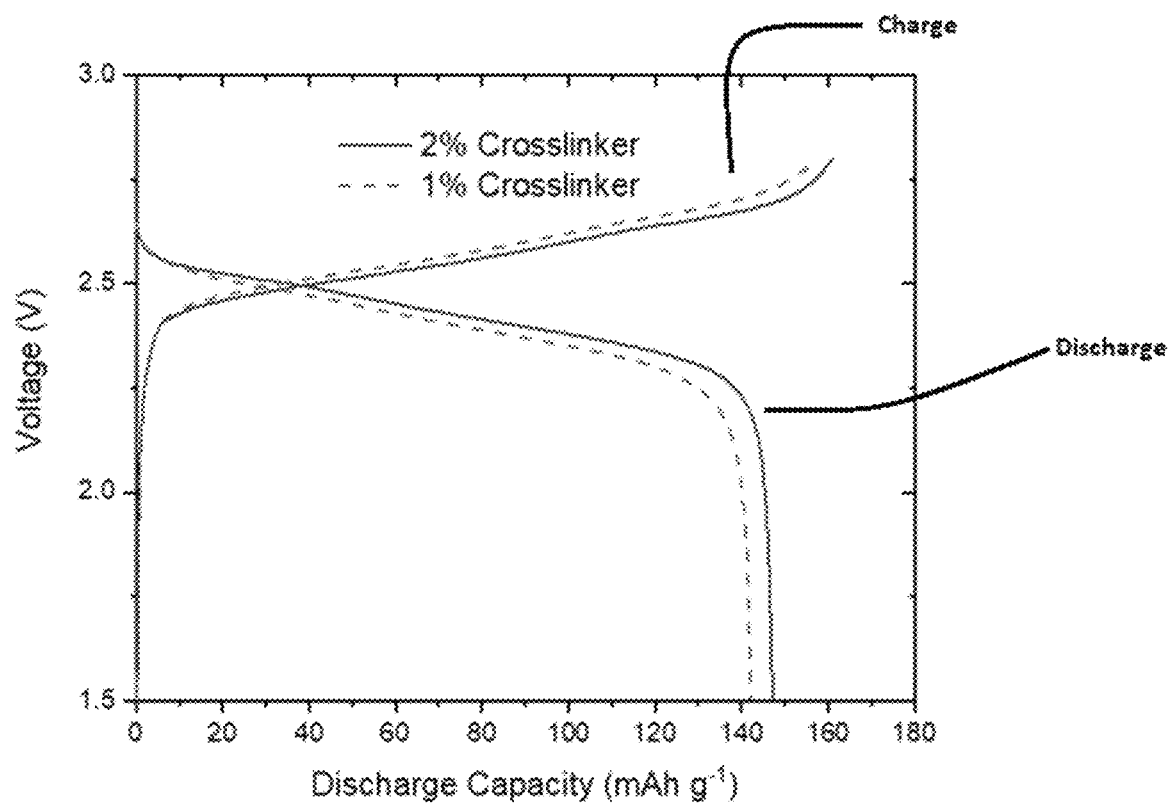
FIG. 17 shows the discharge capacities for the electrochemical cells of FIG. 16 according to certain embodiments of the invention.

FIG. 16 is a plot showing excellent capacity retention and performance for electrochemical cells made using equal parts of HEA and MPEGA, while PEGDA (cross-linker) makes up the difference in the compositions. Both electrochemical cells perform well, although increasing the PEGDA appears to negatively impact performance slightly, due to reduced ion mobility at higher cross-linker levels. GPEs were made using 30 wt. % polymer and 4:1 NMA/LiTFSI DES electrolytes. All electrochemical cells cycled at 0.5 C rate. FIG. 17 shows the discharge capacities for the electrochemical cells of FIG. 16.

FIG. 18 is a plot showing electrochemical cell performance of both GPE and liquid DES-based electrochemical cells into which 1.5 wt % water (based on total electrolyte mass) has been added. Again, electrochemical cell performance is greatly enhanced by the presence of the polymer network. Both starting capacity and capacity retention were improved in the case of the GPE vs liquid DES-based electrochemical cells. In this regard, the presence of the polymer network significantly stabilizes the electrochemical cell performance in the presence of water. This also shows that these types of electrochemical cells are tolerant toward small amounts of water. Liquid DES electrolytes plus water, however, were much worse. The GPE used was EGPE-74-24-2 containing 30 wt. % polymer and 4:1 NMA/LiTFSI DES electrolyte. Electrochemical cells were run at 0.5 C rate. FIG. 19 shows the discharge capacities for the electrochemical cells of FIG. 18.

FIG. 20 is a plot showing that electrochemical cells based on EGPE-74-24-2 are highly efficient and remarkably stable. Starting capacity was high, and capacity retention was excellent over hundreds of cycles. The EGPEs used contain 30 wt. % polymer and use 4:1 NMA/LiTFSI DES electrolyte. FIG. 21 shows the discharge capacity through 250 cycles for the electrochemical cell of FIG. 20.

FIG. 22 is a plot showing electrochemical cell performance of both DES-based GPEs made with and without 1.5 wt % water (based on total electrolyte mass). The polymer stabilizes the system against water decomposition and capacity loss for many cycles as shown in FIG. 22. Starting capacities and capacity retention are excellent in both electrochemical cells. The GPE used was EGPE-74-24-2 containing 30 wt. % polymer and 4:1 NMA/LiTFSI DES electrolyte. Electrochemical cells were run at 0.5 C rate. FIG. 23 shows the discharge capacities for the electrochemical cells of FIG. 22.

FIG. 24 is a plot of the discharge capacities vs. cycle number for each of the electrochemical cells run at 0.5 C rate, while FIG. 25 provides an additional plot of the discharge capacities vs. cycle number for each of the electrochemical cells.

These and other modifications and variations to the invention may be practiced by those of ordinary skill in the art without departing from the spirit and scope of the invention, That which is claimed:

1. An electrochemical cell, comprising:
an anode;
a cathode;
a gel polymer electrolyte (GPE) positioned between and in contact with the anode and the cathode, wherein the GPE includes a GPE-composition comprising:
a cross-linked three-dimensional polymer network, wherein the cross-linked three-dimensional polymer network comprises a reaction product of (i) 2-hydroxyethyl acrylate, and (ii) poly(ethylene glycol) diacrylate, wherein the poly(ethylene glycol) diacrylate accounts for 1 to 3 wt. % of the cross-linked three-dimensional polymer network based on a total monomer mass of the cross-linked three-dimensional polymer network and (iii) poly(ethylene glycol) methyl ether acrylate, and
an electrolyte composition comprising: a deep eutectic solvent (DES) and an amount of water comprising from 0.5% to 30% by weight of the electrolyte composition; and
a porous battery separator at least partially embedded within the GPE;
wherein the cross-linked three-dimensional polymer network comprises from about 20% to about 45% by weight of the GPE-composition, and wherein the DES comprises from about 55% to about 80% by weight of the GPE composition.

2. The electrochemical cell of claim 1, wherein the DES has a eutectic point of less than or equal to 25° C.

3. The electrochemical cell of claim 1, wherein the cross-linked three-dimensional polymer network comprises from about 20% to about 35% by weight of the GPE composition, and wherein the DES comprises from about 65% to about 80% by weight of the GPE composition.

4. The electrochemical cell of claim 1, wherein the DES comprises at least one hydrogen bond donor and at least one hydrogen bond acceptor.

5. The electrochemical cell of claim 4, wherein the at least one hydrogen bond acceptor comprises a lithium salt, a zinc salt, or combination thereof.

6. The electrochemical cell of claim 4, wherein the at least one hydrogen bond acceptor comprises lithium bis(trifluoromethanesulfonyl)imide (LiTFSI), lithium trifluoromethanesulfonate (LiOTf), lithium chloride (LiCl), lithium hexafluorophosphate ($LiPF_6$), a lithium polysulfide, lithium perchlorate ($LiClO_4$), lithium bromide (LiBr), lithium iodide (LiI), lithium thiocyanate (LiSCN), lithium tetrafluoroborate ($LiBF_4$), lithium hexafluoroarsenate ($LiAsF_6$), lithium bis (oxalate)borate (LiBOB), LiFAP [$LiPF_3(CF_2CF_3)_3$], zinc trifluoromethanesulfonate ($Zn(OTf)_2$), zinc di[bis(trifluoromethanesulfonyl)imide)] $Zn(TFSI)_2$, or combinations thereof.

7. The electrochemical cell of claim 4, wherein the hydrogen bond acceptor comprises a salt having a positively charged nitrogen atom, a positively charged phosphorous atom, an alcohol, a carboxylic acid, a primary amine, a secondary amine, a tertiary amine, or combinations thereof.

8. The electrochemical cell of claim 4, wherein the at least one hydrogen bond donor comprises from about 10 mole % to about 90 mole % of the DES, and the at least one hydrogen bond acceptor comprises from about 10 mole % to about 90 mole % of the DES.

9. The electrochemical cell of claim 4, wherein a eutectic point is defined by a first amount of the at least one hydrogen bond donor and a second amount of the hydrogen bond acceptor, and the DES comprises a mixture of: (i) the at least one hydrogen bond donor present within about 30% of the first amount, and/or (ii) the at least one hydrogen bond acceptor within about 30% of the second amount.

10. The electrochemical cell of claim 4, wherein the electrolyte composition includes an amount of water comprising from about 0.5% to about 10% by weight of the electrolyte composition.

11. The electrochemical cell of claim 1, wherein the porous battery separator is completely embedded within the GPE.

* * * * *